US011803389B2

(12) United States Patent
Tekmen et al.

(10) Patent No.: US 11,803,389 B2
(45) Date of Patent: Oct. 31, 2023

(54) REACH MATRIX SCHEDULER CIRCUIT FOR SCHEDULING INSTRUCTIONS TO BE EXECUTED IN A PROCESSOR

(71) Applicant: Microsoft Technology Licensing, LLC, Redmond, WA (US)

(72) Inventors: Yusuf Cagatay Tekmen, Raleigh, NC (US); Rodney Wayne Smith, Raleigh, NC (US); Douglas C. Burger, Bellevue, WA (US); Gagan Gupta, Bellevue, WA (US); Kiran Ravi Seth, Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

(21) Appl. No.: 16/738,362

(22) Filed: Jan. 9, 2020

(65) Prior Publication Data

US 2021/0216327 A1 Jul. 15, 2021

(51) Int. Cl.
*G06F 9/38* (2018.01)

(52) U.S. Cl.
CPC .......... *G06F 9/3838* (2013.01); *G06F 9/3836* (2013.01)

(58) Field of Classification Search
CPC .............................. G06F 9/3836; G06F 9/3838
See application file for complete search history.

(56) References Cited

U.S. PATENT DOCUMENTS

| 6,334,182 | B2* | 12/2001 | Merchant | G06F 8/445 |
| | | | | 712/214 |
| 6,988,185 | B2* | 1/2006 | Stark, IV | G06F 9/3836 |
| | | | | 712/214 |
| 2003/0140216 | A1 | 7/2003 | Stark, IV et al. | |
| 2008/0244224 | A1* | 10/2008 | Sassone | G06F 9/3838 |
| | | | | 712/23 |
| 2010/0257339 | A1* | 10/2010 | Brown | G06F 9/3842 |
| | | | | 712/214 |
| 2012/0159217 | A1 | 6/2012 | Venkataramanan et al. | |

(Continued)

OTHER PUBLICATIONS

Hsiao et al., "Wake-Up Logic Optimizations Through Selective Match and Wakeup Range Limitation", Oct. 2006, pp. 1089-1102.*

(Continued)

*Primary Examiner* — David J. Huisman
(74) *Attorney, Agent, or Firm* — Withrow & Terranova, PLLC

(57) ABSTRACT

A reach matrix scheduler circuit for scheduling instructions to be executed in a processor is disclosed. The scheduler circuit includes an N×R matrix wake-up circuit, where 'N' is the instruction window size of the scheduler circuit, and 'R' is the "reach" within the instruction window of the matrix wake-up circuit, with 'R' being less than 'N'. A grant line associated with each instruction request entry in the N×R matrix wake-up circuit is coupled to 'R' other instruction entries among the 'N' instruction entries. When a producer instruction in an instruction request entry is ready for issuance, the grant line associated with the instruction request entry is activated so that any other instruction entries coupled to the grant line (i.e., within the "reach" of the instruction request entry) that consume the produced value generated by the producer instruction are "woken-up" and subsequently indicated as ready to be issued.

9 Claims, 8 Drawing Sheets

(56) References Cited

U.S. PATENT DOCUMENTS

2013/0339679 A1* 12/2013 Iyer .................... G06F 9/3836
                                                      712/225
2019/0163482 A1*  5/2019 Silberman ............ G06F 9/3851
2019/0377599 A1* 12/2019 Abhishek Raja ..... G06F 9/4881

OTHER PUBLICATIONS

Chen et al., "Scalable Dynamic Instruction Scheduler through Wake-Up Spatial Locality", Nov. 2007, pp. 1534-1548.*

"International Search Report and Written Opinion Issued in PCT Application No. PCT/US20/062098", dated Mar. 15, 2021, 15 Pages.

Peter, et al., "Matrix Scheduler Reloaded," In Proceedings of the 34th Annual International Symposium on Computer Architecture, vol. 35, Jun. 9, 2007, pp. 335-346.

* cited by examiner

REACH MATRIX SCHEDULER CIRCUIT FOR SCHEDULING INSTRUCTIONS TO BE EXECUTED IN A PROCESSOR

FIELD OF THE DISCLOSURE

The technology of the disclosure relates to computer processors ("processors"), and more particularly to scheduler circuits that schedule execution of instructions in an instruction pipeline in a processor.

BACKGROUND

Microprocessors, also known as "processors," perform computational tasks for a wide variety of applications. A conventional microprocessor includes a central processing unit (CPU) that includes one or more processor cores, also known as "CPU cores." The CPU executes computer program instructions ("instructions"), also known as "software instructions," to perform operations based on data and generate a result, which is a produced value. An instruction that generates a produced value is a "producer" instruction. The produced value may then be stored in memory, provided as an output to an input/output ("I/O") device, or made available (i.e., communicated) as an input value to another "consumer" instruction executed by the CPU, as examples. Thus, a consumer instruction is dependent on the produced value produced by a producer instruction as an input value to the consumer instruction for execution. These producer and consumer instructions are also referred to collectively as dependent instructions.

Instruction pipelining is a processing technique whereby the throughput of instructions being executed by a processor may be increased by splitting the handling of each instruction into a series of steps. These steps are executed in one or more instruction pipelines each composed of multiple stages in an instruction processing circuit in a processor. Optimal processor performance may be achieved if all stages in an instruction pipeline are able to process instructions concurrently and sequentially as the instructions are ordered in the instruction pipeline. Also, many modern processors are out-of-order processors that are capable of dataflow execution of instructions based on availability of input data to be consumed by the instructions rather than the program order of the instructions. Thus, the out-of-order processor may execute an instruction as soon as all input data to be consumed by the instruction has been produced. While dataflow order processing of instructions may cause the specific order in which instructions are executed to be unpredictable, dataflow order execution in an out-of-order processor may realize performance gains. For example, instead of having to "stall" (i.e., intentionally introduce a processing delay) while input data to be consumed is retrieved for an older instruction, the out-of-order processor may proceed with executing a more recently fetched instruction that is able to execute immediately. In this manner, processor clock cycles that would otherwise be unused for instruction processing and execution may be productively utilized by the out-of-order processor.

An instruction processing circuit in a processor fetches instructions to be executed from an instruction memory. The fetched instructions are decoded and inserted into an instruction pipeline in the instruction processing circuit to be pre-processed before reaching an execution circuit to be executed. The instruction processing circuit includes a scheduler circuit that is responsible for determining which instructions within an instruction window to issue to issue lanes (pipelines) to be executed in an execution circuit. The instruction window is the maximum number of instructions that the scheduler circuit has access to for scheduling. In this regard, the scheduler circuit includes a wake-up circuit and one or more pick circuits. The wake-up circuit combines the source operand information for each consumer instruction within an instruction window with the producer information of instructions that are issuing (and already have issued) to determine which instructions are ready to issue. A consumer instruction is ready to issue if all the source operands that it needs already have been produced and are available or will be produced and available just in time. The list of instructions that are ready to issue are an input to a pick circuit in the scheduler circuit. Typically, there are multiple pick circuits each feeding an issue lane for a specific execution pipe. Instructions that are ready to issue are qualified with which pick circuit they will participate in and become "active" for that particular pick circuit. Among the instructions that are active, the pick circuit determines which instruction should issue next. This determination can be done in many different ways, but typically there is some priority that is used. Picking the oldest instruction among the active instructions is conventionally preferred for performance reasons.

A conventional wake-up circuit in a scheduler circuit is provided in the form of an N×N matrix for each operand, where 'N' is the instruction window size. Each row in an N×N matrix wake-up circuit for a given operand corresponds to an instruction within the instruction window and encapsulates the instruction's consumer information. Each column in the N×N matrix wake-up circuit conveys the producer information as instructions issue to allow the instructions to be issued when its producer information is available to be consumed. As producer instructions in an N×N matrix wake-up circuit produce a value, a grant line in a column in the N×N matrix wake-up circuit is energized to wake-up a consumer instruction that depends on the produced value from the producer instruction. This causes the woken consumer instruction to be issued in a ready state to the pick circuit to be picked and issued in an execution lane for execution.

A large instruction window is typically desired in a scheduler circuit to exploit instruction-level parallelism (ILP) and increased performance. However, increasing the instruction window size means that the operand N×N matrix wake-up circuits will necessarily be expanded. The increased 'N' column depth of an N×N matrix wake-up circuit adds circuit delays and can risk achieving a single clock cycle timing in the scheduler circuit from instruction grant, to instruction ready, to instruction pick up and back to instruction grant. An important part of a wake-up design in a scheduler circuit is that a consumer instruction that is dependent on a single-cycle latency producer instruction can be issued by the scheduler circuit in back-to-back clock cycles with the producer instruction to reduce scheduling latency.

SUMMARY

Exemplary aspects disclosed herein include a reach matrix scheduler circuit for scheduling of instructions to be executed in a processor. The processor includes an instruction processing circuit that includes a number of instruction processing stages configured to pipeline the processing and execution of fetched instructions according to a dataflow execution. A scheduler circuit is included in the instruction processing circuit for controlling the issuance of instructions into an issue lane for execution. The scheduler circuit includes a wake-up circuit that is configured to wake up an instruction as ready to be issued to be executed once it is known that the produced value(s) to be consumed by the consumer instruction according to its named source operand(s) will be available. The scheduler circuit also includes one or more pick circuits that are configured to issue ready instructions into an instruction lane in the instruction processing circuit to be executed.

In exemplary aspects disclosed herein, the wake-up circuit in the scheduler circuit includes a plurality of N×R matrix wake-up circuits each associated with a source operand, where 'N' is the instruction window size of the scheduler circuit, and where 'R' is the number of grant lines and thus the "reach" with the instruction window of matrix wake-up circuit, with 'R' being less than 'N'. Each matrix wake-up circuit includes 'N' instruction entries organized as rows and that are each configured to store a dispatched instruction for issuance that names a source operand associated with the particular matrix wake-up circuit. A grant line associated with each instruction request entry in the N×R matrix wake-up circuit is coupled to 'R' other instruction entries among the 'N' instruction entries in the N×R matrix wake-up circuit. When a producer instruction in an instruction request entry in a matrix wake-up circuit is ready to be issued, the grant line associated with the instruction request entry is activated so that any other instruction entries coupled to the grant line (i.e., within the "reach" of the instruction request entry) that consume the produced value generated by the producer instruction are "woken-up" and ready to be issued. Because 'R' is less than 'N', each instruction request entry in the matrix wake-up circuit can only wake up 'R' subset of instructions among 'N' possible instruction entries. This is in contrast to an N×N matrix wake-up circuit, for example, where each grant line associated with an instruction request entry is coupled to every other instruction request entry, thus allowing any producer instruction in an instruction request entry to wake up any other instruction in any other instruction request entry.

The reduction of grant lines from 'N' to 'R' in the N×R matrix wake-up circuit is based on a recognition that a producer instruction in an instruction request entry in the matrix wake-up circuit may not often have the need to wake up a consumer instruction in any other instruction request entry. This is because most consumer instructions are local to and located a short distance behind its producer instruction in an instruction stream in the instruction processing circuit. Thus, most consumer instructions are assigned an instruction request entry close (i.e., within a certain "reach") to its producer instruction in another instruction request entry in the matrix wake-up circuit. 'R' of the N×R matrix wake-up circuit can be designed to be based on the typical reach between a consumer instruction and its producer instruction assigned to instruction entries in the matrix wake-up circuit. Having to couple the grant lines associated with instruction entries in a matrix wake-up circuit to only 'R' instruction entries, as opposed to all 'N' instruction entries of the instruction window size, can reduce the complexity of grant line routing as well as the number of gating inputs needed to provide the ready circuitry in instruction request entry to wake up an instruction as ready to be issued. This can reduce the timing delay or propagation delay of the instruction granting process to wake up instructions as ready to be executed from the scheduler circuit. Also, this reduced timing delay may allow an increase the instruction window size 'N' of the wake-up matrix circuit for greater efficiency to better keep all issue lanes full to avoid or reduce execution bubbles without increasing the overall timing delay of scheduling in a processor. 'R' can be chosen based on the desired tradeoff of reducing circuit routing and complexity that affects wake-up timing delay versus the desired reach in the matrix wake-up circuit.

There may be cases where a consumer instruction is assigned an instruction request entry in a N×R matrix wake-up circuit farther away from its producer instruction than the reach 'R' of the N×R matrix wake-up circuit. Thus, it may be desired to provide a secondary wake-up mechanism to allow such producer instruction to trigger a wake-up of this consumer instruction. As one example of a secondary wake-up mechanism, the instruction processing circuit in the processor can be configured to recognize when a consumer instruction would be outside the reach of its producer instruction when assigned to an instruction request entry in the N×R matrix wake-up circuit. In this instance, the instruction processing circuit can be configured to stall dispatch of the consumer instruction in its instruction pipeline to the scheduler circuit. In this manner, the consumer instruction is not assigned an instruction request entry in the matrix wake-up circuit until its producer instruction has already been issued by the scheduler circuit to generate a produced value to be consumed by the consumer instruction. In response to execution of the producer instruction, the consumer instruction can be assigned an instruction request entry in the N×R matrix wake-up circuit that is immediately ready to be woken without having to wait for the producer instruction to be issued.

In another example, an alternative secondary wake-up mechanism can be provided in the instruction processing circuit to be able to wake-up a consumer instruction that is outside the reach of its producer instruction. In this example, the instruction processing circuit includes a content addressable memory (CAM) circuit that is configured to compare a tag assigned to a consumer instruction to a tag assigned to its producer instruction. For example, a rename circuit in the instruction processing circuit can be configured to assign the same tag to a consumer instruction as was assigned to its producer instruction. If the tag assigned to the consumer instruction matches a tag assigned to another instruction as its producer instruction, it is known that the producer instruction has already been dispatched to the scheduler circuit. The instruction processing circuit can be configured to wake up the consumer instruction as ready to be issued. For example, each instruction request entry in the matrix wake-up circuit can include a ready bypass circuit that is configured to wake up its assigned instruction as ready when activated. The CAM circuit can be coupled to the ready bypass circuits to be able to cause a consumer instruction in an instruction request entry in the matrix wake-up circuit to be woken up as ready when it is known that its producer instruction has been issued based on the tag comparison.

In another example, if it is known that all consumer instructions are within reach of its producer instructions, the instruction processing circuit can be configured to disable the secondary wake-up mechanism. For example, all consumer instructions within reach of its producer instructions may be controlled by a compiler or other enforceable design constraint. Disabling a secondary wake-up mechanism can conserve power consumption. The secondary wake-up mechanism can be enabled if for any reason, the constraint that all consumer instructions are within reach of its producer instructions is no longer valid.

In this regard, in one exemplary aspect, a scheduler circuit in a processor is disclosed. The scheduler circuit comprises at least one matrix wake-up circuit each comprising N instruction request row circuits, where N is a positive whole number equal to or greater than two (2). Each instruction request row circuit among the N instruction request row circuits comprises a plurality of source operand request circuits each associated with a source operand column among R source operand columns, where R is a positive whole number less than N, and R grant circuits each coupled to a source operand request circuit among the plurality of source operand request circuits. The at least one matrix wake-up circuit each further comprises N grant lines each associated with an instruction request row circuit among the N instruction request row circuits, each grant line among the N grant lines coupled to R grant circuits in the same source operand column in R instruction request row circuits among the N instruction request row circuits.

In another exemplary aspect, a method of scheduling a plurality of instructions comprising producer instructions and consumer instructions to be executed in an execution circuit in a processor is disclosed. The comprises receiving a dispatched instruction comprising a source operand, and assigning the received dispatched instruction to an instruction request row circuit among N instruction request row circuits in a matrix wake-up circuit associated with the source operand. The matrix wake-up circuit comprises the N instruction request row circuits, where N is a positive whole number equal to or greater than two (2), wherein each instruction request row circuit among the N instruction request row circuits comprises a plurality of source operand request circuits each associated with a source operand column, and R grant circuits wherein R is a positive whole number less than N, each grant circuit among the R grant circuits coupled to a source operand request circuit among the plurality of source operand request circuits. The matrix wake-up circuit further comprises N grant lines each associated with an instruction request row circuit among the N instruction request row circuits, each grant line among the N grant lines coupled to R grant circuits in the same source operand column in R instruction request row circuits among the N instruction request row circuits. The method further comprises storing a request state in at least one source operand request circuit among the plurality of source operand request circuits in the assigned instruction request row circuit for the received dispatched instruction, associated with at least one grant circuit among the R grant circuits coupled to at least one grant line associated with an instruction request row circuit that is assigned to a producer instruction naming a target operand comprising a source operand of the dispatched instruction. The method further comprises generating a grant output of a granted state from the at least one grant circuit in the instruction request row circuit assigned to the dispatched instruction, based on a request state stored in at least one source operand request circuit coupled to the at least one grant circuit and the at least one grant line coupled to the at least one grant circuit being in a granted state. The method further comprises generating a ready output of a ready state, based on the at least one grant circuit in the instruction request row circuit assigned to the dispatched instruction generating the grant output of the granted state.

In another exemplary aspect a processor is disclosed. The processor comprises an instruction processing circuit comprising one or more instruction pipelines comprising a scheduler circuit, a rename circuit, and an execution circuit. The instruction processing circuit is configured to fetch a plurality of instructions from a memory into an instruction pipeline among the one or more instruction pipelines. The scheduler circuit is configured to receive the plurality of instructions comprising producer instructions and consumer instructions to be scheduled for execution. The scheduler circuit comprises a plurality of N×R matrix wake-up circuits each corresponding to a source operand and each comprising N instruction request row circuits, where N is a positive whole number equal to or greater than two (2). Each instruction request row circuit among the N instruction request row circuits comprises a plurality of source operand request circuits each associated with a source operand column among R source operand columns, where R is a positive whole number less than N, and R grant circuits each coupled to a source operand request circuit among the plurality of source operand request circuits. The plurality of N×R matrix wake-up circuits each corresponding to a source operand further comprises N grant lines each associated with an instruction request row circuit among the N instruction request row circuits, each grant line among the N grant lines coupled to R grant circuits in the same source operand column in R instruction request row circuits among the N instruction request row circuits. The scheduler circuit further comprises at least one pick circuit corresponding to each matrix wake-up circuit among the plurality of matrix wake-up circuits, the at least one pick circuit configured to issue an instruction to at least one issue lane in the one or more instruction pipelines, in response to receiving a ready signal indicating a ready state for the instruction.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
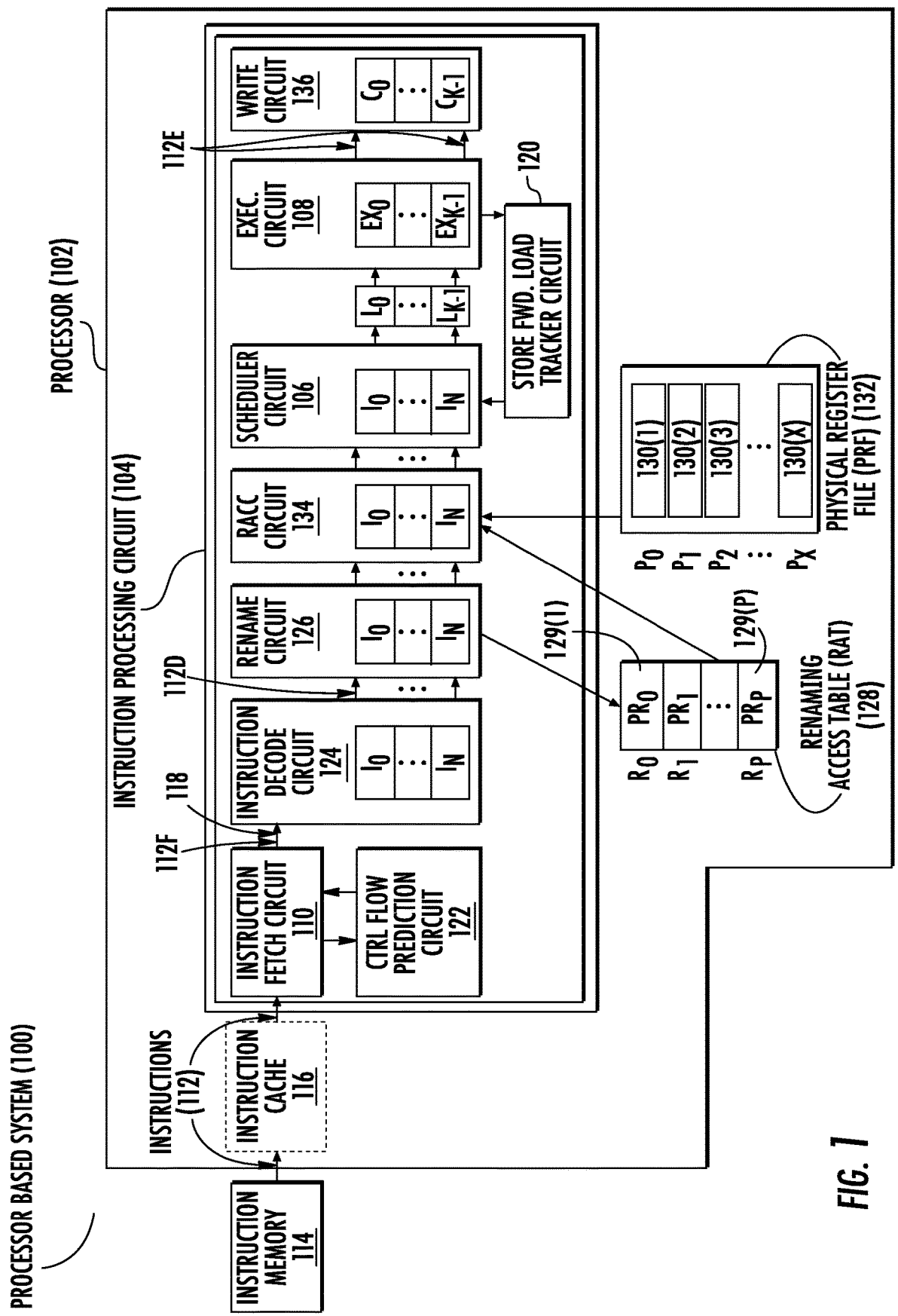
FIG. 1 is a diagram of an exemplary processor-based system that includes a processor with an instruction processing circuit that includes one or more instruction pipelines for processing computer instructions for execution, wherein the instruction processing circuit includes a scheduler circuit to schedule issuance of instructions to be executed.
Figure 2:
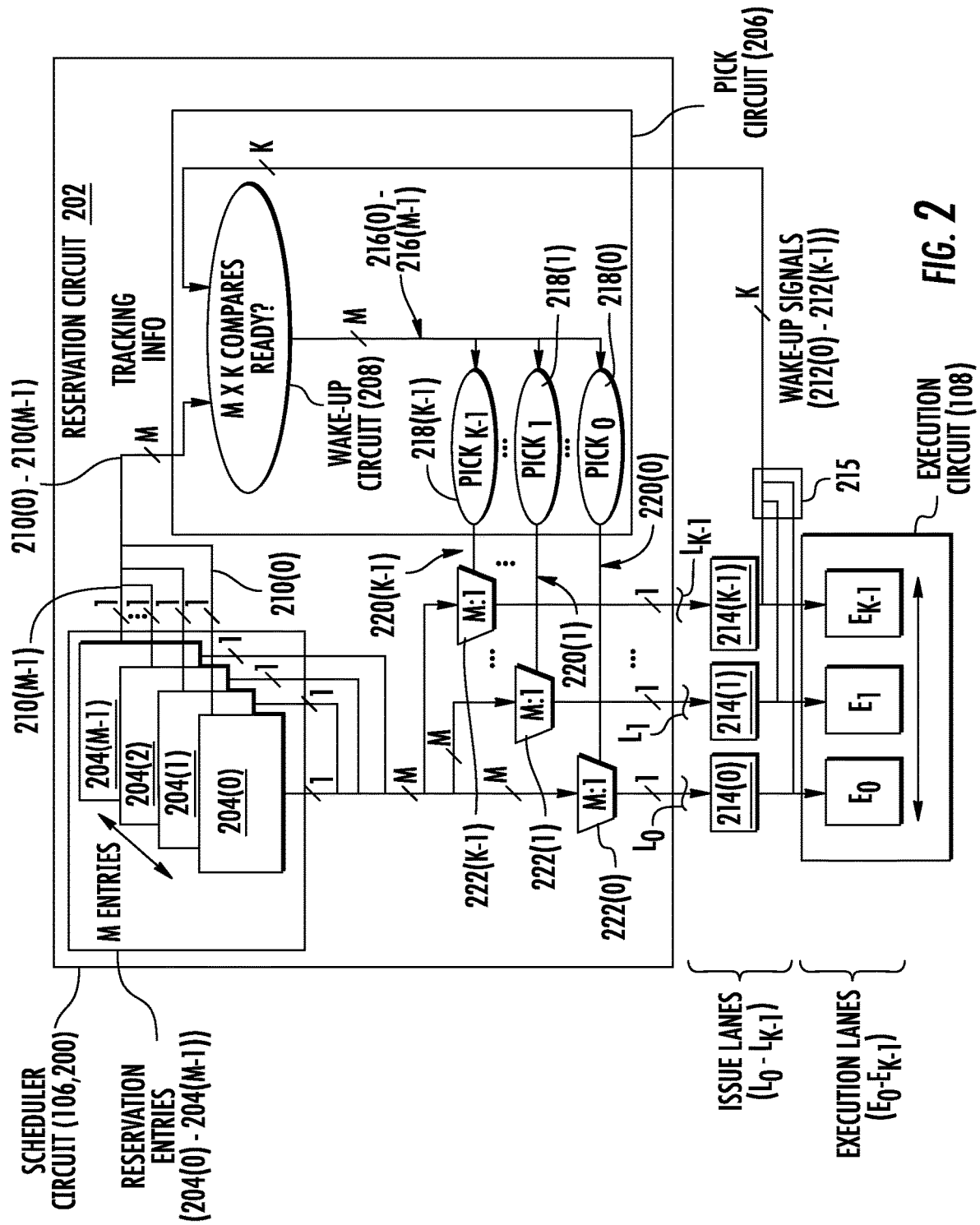
FIG. 2 is a diagram of an exemplary scheduler circuit that can be included in the instruction processing circuit in the processor in FIG. 1, wherein the scheduler circuit is configured to schedule issuance of instructions to issue lanes to be executed by an execution circuit.
Figure 3:
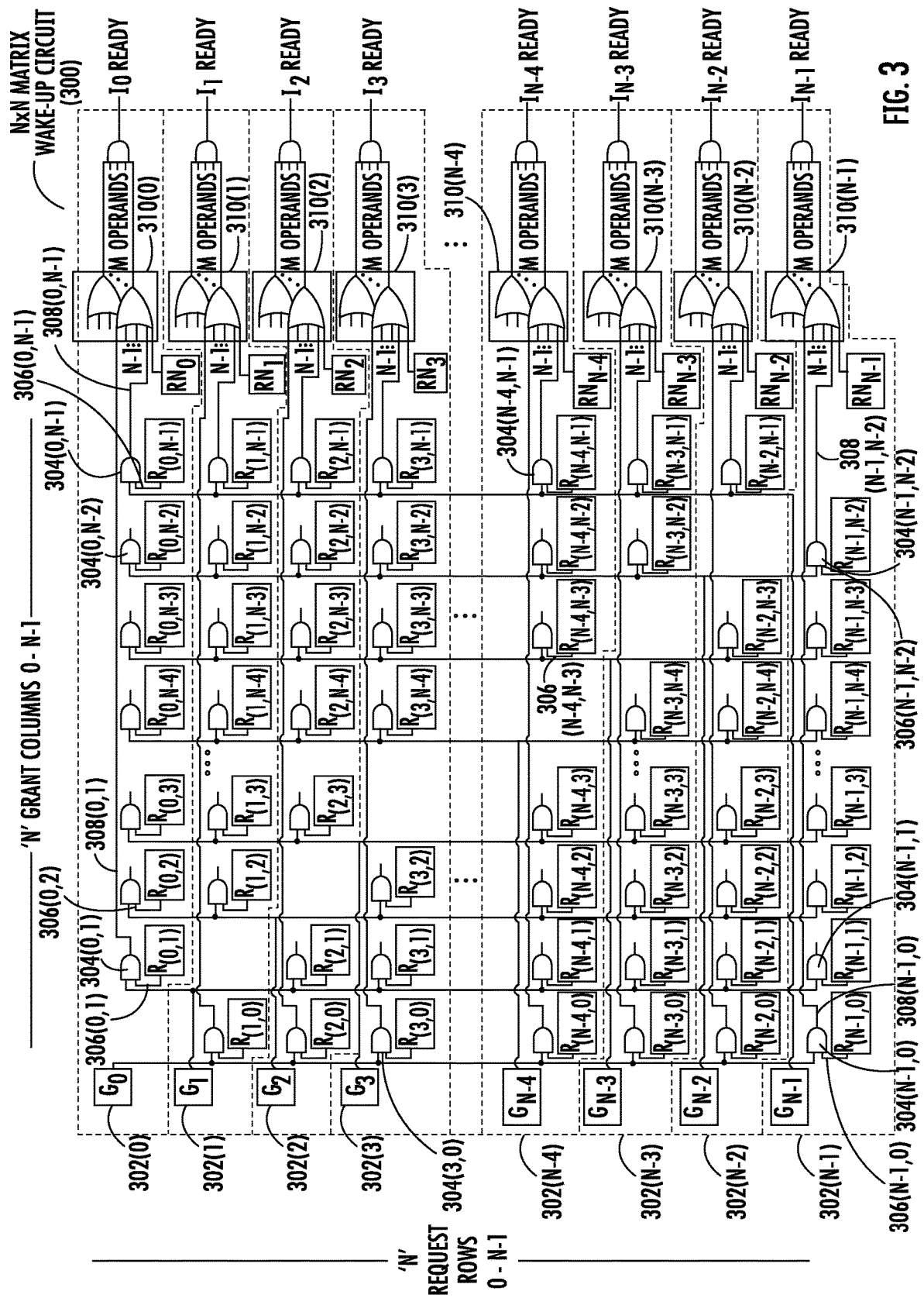
Figure 4:
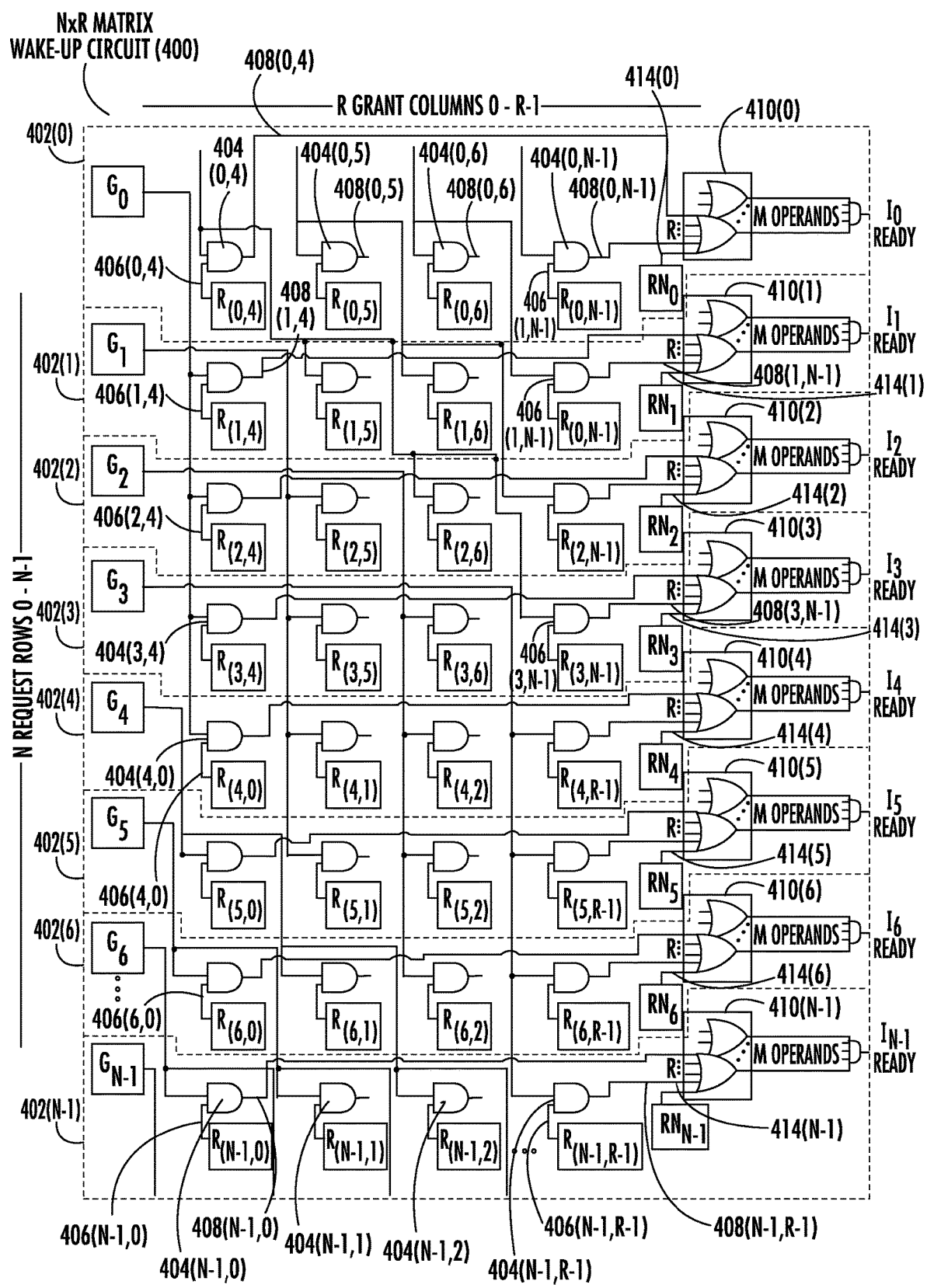
Figure 5:
Figure 6:
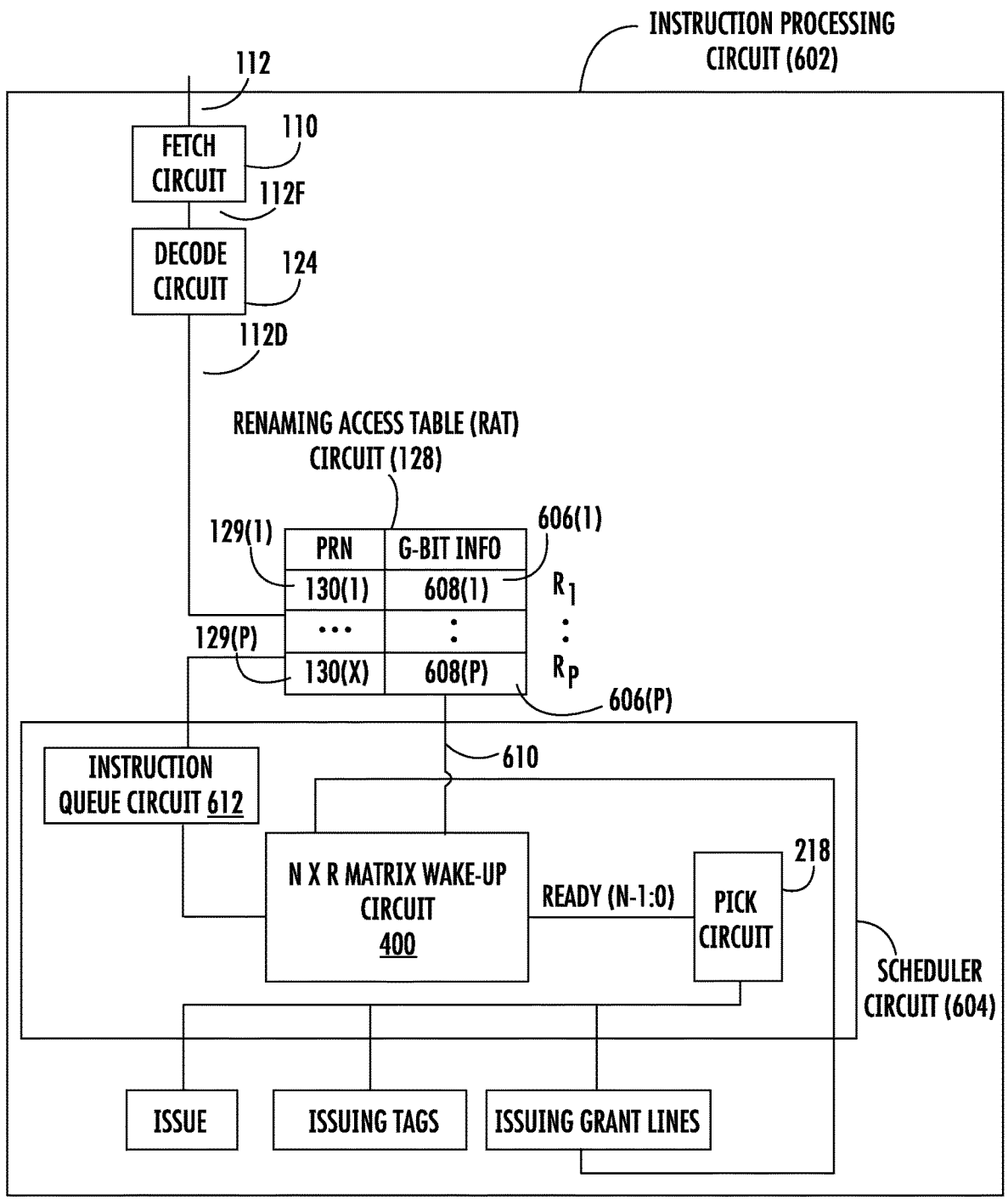
Figure 7:
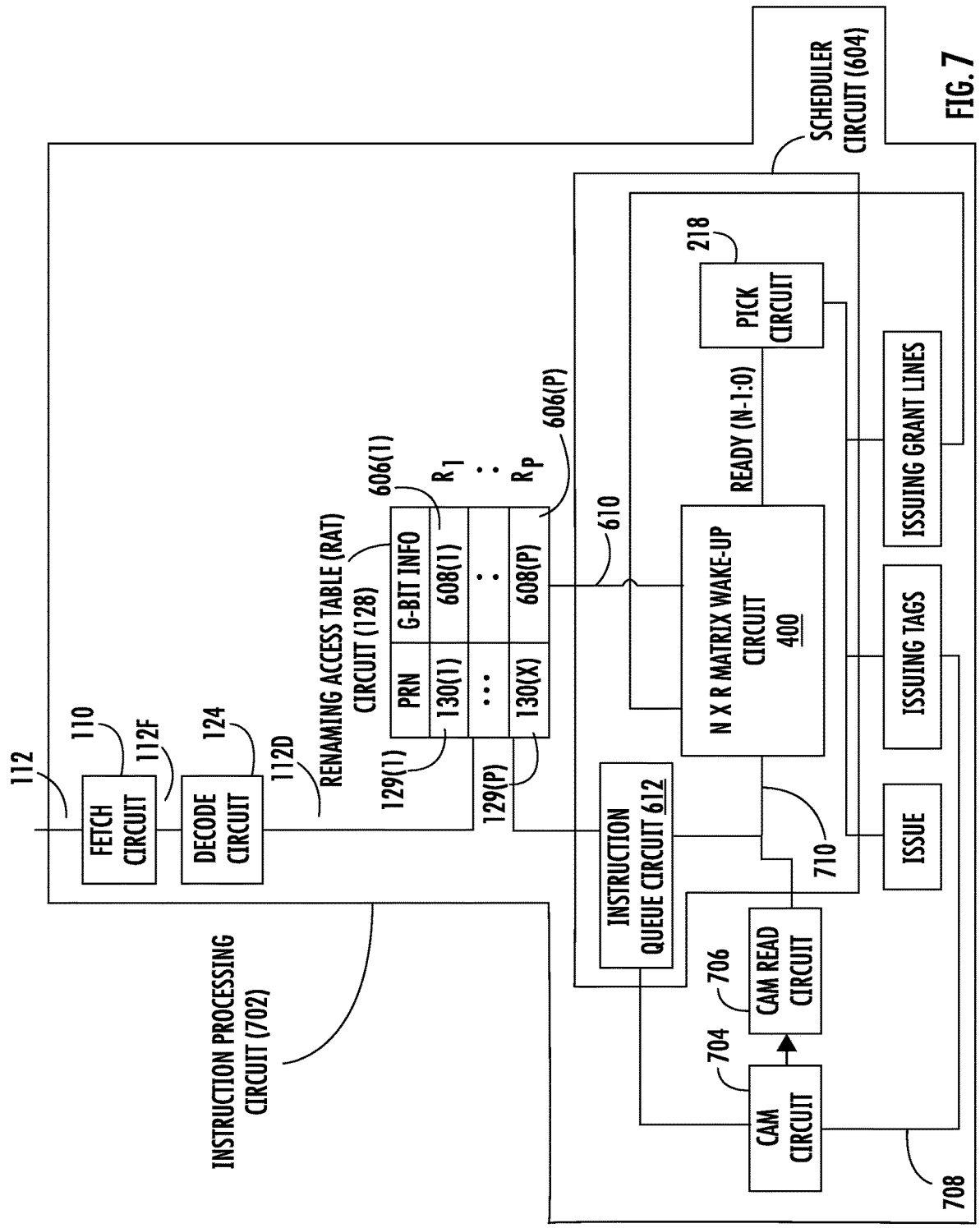
Figure 8:
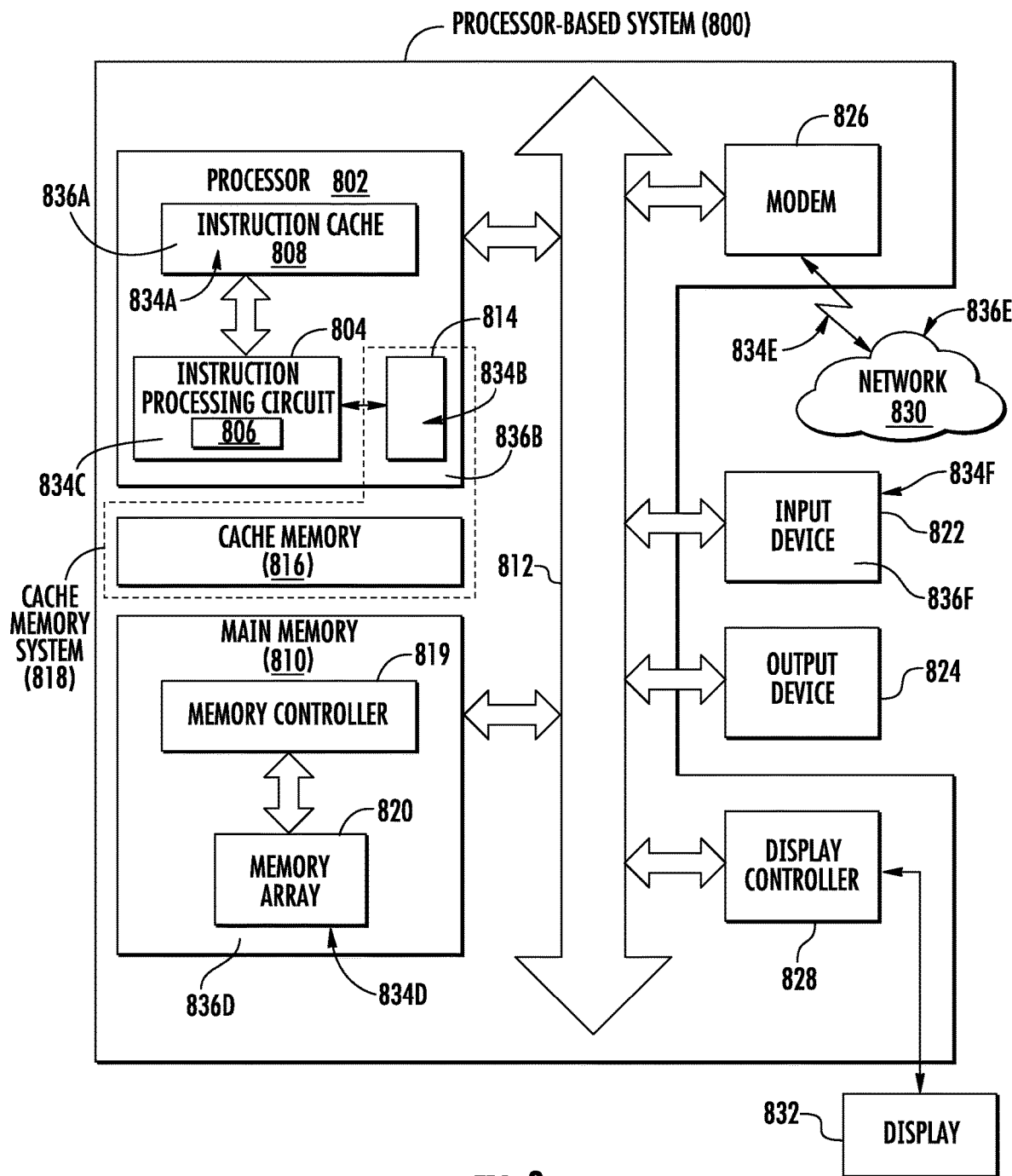

FIG. 3 is a diagram of an exemplary N×N matrix wake-up circuit that can be provided in the scheduler circuit in FIGS. 1 and 2 and is configured to wake up instructions ready to be issued, wherein the N×N matrix wake-up circuit includes 'N' instruction entries each configured to store a dispatched instruction for issuance and each having an associated grant line coupled to every other instruction request entry, thus allowing any producer instruction in an instruction request entry to wake up any other instruction in any other instruction request entry;

FIG. 4 is a diagram of an exemplary N×R matrix wake-up circuit that can be provided in the scheduler circuit in FIGS. 1 and 2 and is configured to wake up instructions ready to be issued, wherein the N×R matrix wake-up circuit includes 'N' instruction entries each configured to store a dispatched instruction for issuance and each having an associated grant line coupled to 'R' instruction entries among the 'N' instruction entries, wherein 'R' is less than 'N', and thus allowing a producer instruction in an instruction request entry to wake up a consumer instruction in any other instruction request entry with reach 'R';

FIG. 5 is a flowchart illustrating an exemplary process of a consumer instruction(s) in an instruction request entry in the N×R matrix wake-up circuit in FIG. 4 being woken up by issuance of a producer instruction that was assigned another instruction request entry with reach 'R' of the consumer instruction;

FIG. 6 is a diagram of an exemplary processor-based system that includes a processor with an instruction processing circuit that includes an exemplary secondary wake-up mechanism to stall dispatch of a consumer instruction to the scheduler circuit in response to determining the consumer instruction is outside the reach of its producer instruction(s);

FIG. 7 is a diagram of an exemplary processor with an instruction processing circuit that includes another exemplary secondary wake-up mechanism to delay wake-up of a consumer instruction in the N×R matrix wake-up circuit in FIG. 4 in response to determining the consumer instruction is outside the reach of its producer instruction(s); and FIG. 8 is a block diagram of an exemplary processor-based system that includes a processor with an instruction processing circuit that includes a scheduler circuit that includes one or more N×R matrix wake-up circuits each associated with a source operand, wherein each N×R matrix wake-up circuit includes 'N' instruction entries each configured to store a dispatched instruction for issuance and each having an associated grant line coupled to 'R' instruction entries among the 'N' instruction entries, wherein 'R' is less than 'N', including but not limited to the N×R matrix wake-up circuits in FIGS. 4, 6, and 7.

DETAILED DESCRIPTION

Exemplary aspects disclosed herein include a reach matrix scheduler circuit for scheduling of instructions to be executed in a processor. The processor includes an instruction processing circuit that includes a number of instruction processing stages configured to pipeline the processing and execution of fetched instructions according to a dataflow execution. A scheduler circuit is included in the instruction processing circuit for controlling the issuance of instructions into an issue lane for execution. The scheduler circuit includes a wake-up circuit that is configured to wake up an instruction as ready to be issued to be executed once it is known that the produced value(s) to be consumed by the consumer instruction according to its named source operand(s) will be available. The scheduler circuit also includes one or more pick circuits that are configured to issue ready instructions into an instruction lane in the instruction processing circuit to be executed.

In exemplary aspects disclosed herein, the wake-up circuit in the scheduler circuit includes a plurality of N×R matrix wake-up circuits each associated with a source operand, where 'N' is the instruction window size of the scheduler circuit, and where 'R' is the number of grant lines and thus the "reach" with the instruction window of matrix wake-up circuit, with 'R' being less than 'N'. Each matrix wake-up circuit includes 'N' instruction entries organized as rows and that are each configured to store a dispatched instruction for issuance that names a source operand associated with the particular matrix wake-up circuit. A grant line associated with each instruction request entry in the N×R matrix wake-up circuit is coupled to 'R' other instruction entries among the 'N' instruction entries in the N×R matrix wake-up circuit. When a producer instruction in an instruction request entry in a matrix wake-up circuit is ready to be issued, the grant line associated with the instruction request entry is activated so that any other instruction entries coupled to the grant line (i.e., within the "reach" of the instruction request entry) that consume the produced value generated by the producer instruction are "woken-up" and ready to be issued. Because 'R' is less than 'N', each instruction request entry in the matrix wake-up circuit can only wake up 'R' subset of instructions among 'N' possible instruction entries. This is in contrast to an N×N matrix wake-up circuit, for example, where each grant line associated with an instruction request entry is coupled to every other instruction request entry, thus allowing any producer instruction in an instruction request entry to wake up any other instruction in any other instruction request entry.

The reduction of grant lines from 'N' to 'R' in the N×R matrix wake-up circuit is based on a recognition that a producer instruction in an instruction request entry in the matrix wake-up circuit may not often have the need to wake up a consumer instruction in any other instruction request entry. This is because most consumer instructions are local to and located a short distance behind its producer instruction in an instruction stream in the instruction processing circuit. Thus, most consumer instructions are assigned an instruction request entry close (i.e., within a certain "reach") to its producer instruction in another instruction request entry in the matrix wake-up circuit. 'R' of the N×R matrix wake-up circuit can be designed to be based on the typical reach between a consumer instruction and its producer instruction assigned to instruction entries in the matrix wake-up circuit. Having to couple the grant lines associated with instruction entries in a matrix wake-up circuit to only 'R' instruction entries, as opposed to all 'N' instruction entries of the instruction window size, can reduce the complexity of grant line routing as well as the number of gating inputs needed to provide the ready circuitry in instruction request entry to wake-up an instruction as ready to be issued. This can reduce the timing delay of the instruction granting process to wake up instructions as ready to be executed from the scheduler circuit. Also, this reduced timing delay may allow an increase the instruction window size 'N' of the wake-up matrix circuit for greater efficiency to better keep all issue lanes full to avoid or reduce execution bubbles without increasing the overall timing delay of scheduling in a processor. 'R' can be chosen based on the desired tradeoff of reducing circuit routing and complexity that affects wake-up timing delay versus the desired reach in the matrix wake-up circuit.

FIG. 1 is a schematic diagram of an exemplary processor-based system 100 that includes a processor 102 that includes an instruction processing circuit 104 that includes a scheduler circuit 106 for scheduling instructions to be executed in the processor 102. For example, as discussed in more detail below starting at FIG. 4, the scheduler circuit 106 can be a reach scheduler circuit that includes a wake-up circuit than can include one or more N×R matrix wake-up circuits each associated with a source operand(s), where 'N' is the instruction window size of the scheduler circuit 106, and where 'R' is the number of grant lines and thus the "reach" with the instruction window of matrix wake-up circuit, with 'R' being less than 'N'. The scheduler circuit 106 is configured to issue consumer instructions as ready based on a producer instruction that produces a value for such source operand(s) being issued. Because 'R' is less than 'N' in the matrix wake-up circuits, each instruction request entry in the matrix wake-up circuit can only wake up 'R' subset of instructions among 'N' possible instruction entries. This is in contrast to an N×N matrix wake-up circuit, for example, where each grant line associated with an instruction request entry is coupled to every other instruction request entry, thus allowing any producer instruction in an instruction request entry to wake up any other instruction in any other instruction request entry.

The reduction of grant lines from 'N' to 'R' in a N×R matrix wake-up circuit is based on a recognition that a producer instruction in an instruction request entry in the matrix wake-up circuit may not often have the need to wake up a consumer instruction in any other instruction request entry. This is because most consumer instructions are local to and located a short distance behind its producer instruction in an instruction stream in the instruction processing circuit. Thus, most consumer instructions are assigned an instruction request entry close (i.e., within a certain "reach") to its producer instruction in another instruction request entry in the matrix wake-up circuit. Having to couple the grant lines associated with instructions entries in a matrix wake-up circuit to only 'R' instruction entries, as opposed to all 'N' instruction entries of the instruction window size, can reduce the complexity of grant line routing as well as the number of gating inputs needed to provide the ready circuitry in an instruction request entry to wake up an instruction as ready to be issued.

With continuing reference to FIG. 1, the processor 102 includes the instruction processing circuit 104 that includes one or more instruction pipelines $I_0$-$I_N$ for processing computer instructions for execution. As will be discussed in more detail below, the instruction processing circuit 104 includes the scheduler circuit 106 configured to store and schedule issuance of instructions to an execution circuit 108 to be executed. The processor 102 may be an in-order or an out-of-order processor (OoP) as examples. The processor 102 includes the instruction processing circuit 104. The instruction processing circuit 104 includes an instruction fetch circuit 110 that is configured to fetch instructions 112 from an instruction memory 114. The instruction memory 114 may be provided in or as part of a system memory in the processor-based system 100 as an example. An instruction cache 116 may also be provided in the processor 102 to cache the instructions 112 fetched from the instruction memory 114 to reduce timing delay in the instruction fetch circuit 110. The instruction fetch circuit 110 in this example is configured to provide the instructions 112 as fetched instructions 112F into the one or more instruction pipelines $I_0$-$I_N$ as an instruction stream 118 in the instruction processing circuit 104 to be pre-processed, before the fetched instructions 112F reach the execution circuit 108 to be executed. The fetched instructions 112F in the instruction stream 118 include producer instructions and consumer instructions that consume produced values as a result of the instruction processing circuit 104 executing producer instructions. The instruction pipelines $I_0$-$I_N$ are provided across different processing circuits or stages of the instruction processing circuit 104 to pre-process and process the fetched instructions 112F in a series of steps that can be performed concurrently to increase throughput prior to execution of the fetched instructions 112F by the execution circuit 108. For example, fetched store-based instructions 112F identified as having store-forward loads in the instruction stream 118 can be identified by a store forward load tracker circuit 120 in the instruction processing circuit 104 before being executed to be forwarded to be consumed by fetched consuming load-based instructions 112F.

A control flow prediction circuit 122 (e.g., a branch prediction circuit) is also provided in the instruction processing circuit 104 in the processor 102 in FIG. 1 to speculate or predict the outcome of a predicate of a fetched conditional control instruction 112F, such as a conditional branch instruction, that affects the instruction control flow path of the instruction stream 118 processed in the instruction pipelines $I_0$-$I_N$. The prediction of the control flow prediction circuit 122 can be used by the instruction fetch circuit 110 to determine the next fetched instructions 112F to fetch based on the predicted target address. The instruction processing circuit 104 also includes an instruction decode circuit 124 configured to decode the fetched instructions 112F fetched by the instruction fetch circuit 110 into decoded instructions 112D to determine the instruction type and actions required. The instruction type and action required encoded in the decoded instruction 112D may also be used to determine in which instruction pipeline $I_0$-$I_N$ the decoded instructions 112D should be placed. In this example, the decoded instructions 112D are placed in one or more of the instruction pipelines $I_0$-$I_N$ and are next provided to a rename circuit 126 in the instruction processing circuit 104. The rename circuit 126 is configured to determine if any register names in the decoded instructions 112D need to be renamed to break any register dependencies that would prevent parallel or out-of-order processing. The rename circuit 126 is configured to call upon a renaming access table (RAT) circuit 128 to rename a logical source register operand and/or write a destination register operand of a decoded instruction 112D to available physical registers 130(0)-130(X) ($P_0$, $P_1$, ..., $P_X$) in a physical register file (PRF) 132. The RAT circuit 128 contains a plurality of mapping entries 129(1)-129(P) each mapped to (i.e., associated with) a respective logical register $R_0$-$R_P$. The mapping entries 129(1)-129(P) are each configured to store respective mapping information $PR_0$-$PR_P$ in the form of an address pointer in this example to point to a physical register 130(0)-130(X) in the PRF 132. Each physical register 130(0)-130(X) in the PRF 132 is configured to store a data entry for the source and/or destination register operand of a decoded instruction 112D.

The instruction processing circuit 104 in the processor 102 in FIG. 1 also includes a register access circuit 134 prior to the scheduler circuit 106. The register access circuit 134 is configured to access a physical register 130(1)-130(X) in the PRF 132 based on a mapping entry mapped to a logical register $R_0$-$R_P$ in the RAT circuit 128 of a source register operand of a decoded instruction 112D to retrieve a produced value from an executed instruction 112E in the execution circuit 108. The register access circuit 134 is also configured to provide the retrieved produced value from an executed decoded instruction 112E as the source register operand of a decoded instruction 112D to be executed. Also, in the instruction processing circuit 104, the scheduler circuit 106 is provided in the instruction pipeline $I_0$-$I_N$ and is configured to store decoded instructions 112D in reservation entries until all source register operands for the decoded instruction 112D are available. For example, the scheduler circuit 106 is responsible for determining that the necessary values for operands of a decoded consumer instruction 112D are available before issuing the decoded consumer instruction 112D in an issue lane $L_0$-$L_{K-1}$ among 'K' issue lanes to the execution circuit 108 for execution. The scheduler circuit 106 issues decoded instructions 112D ready to be executed to the execution circuit 108. The number of issue lanes $L_0$-$L_{K-1}$ is typically less than the number of reservation entries in the scheduler circuit 106, so the scheduler circuit 106 employs circuits to dispatch decoded instructions 112D ready to be executed in the issue lanes $L_0$-$L_{K-1}$ according to an issuance scheme. The issuance scheme may be based on the latency of the producer instruction that generates the produced value(s) for a source operand of a decoded instruction 112D. For example, a producer instruction that can be executed and its produced data made available by the execution circuit 108 in one (1) clock cycle is a single clock cycle latency producer instruction. The execution circuit 108 may include multiple execution stages to execute producer instructions that require more than one (1) clock cycle to be executed. The source operands of a decoded instruction 112D can include immediate values, values stored in memory, and produced values from other decoded instructions 112D that would be considered producer instructions to the consumer instruction. The execution circuit 108 is configured to execute decoded instructions 112D issued in an issue lane $L_0$-$L_{K-1}$ from the scheduler circuit 106. A write circuit 136 is also provided in the instruction processing circuit 104 to write back or commit produced values from executed instructions 112E to memory, such as the PRF 132, cache memory, or system memory.

FIG. 2 is a diagram of an exemplary scheduler circuit 200 that can be employed as the scheduler circuit 106 in the instruction processing circuit 104 in FIG. 1 to illustrate exemplary components of the scheduler circuit 200. The scheduler circuit 200 includes a reservation circuit 202 that includes an 'M' number of reservation entries 204(0)-204(M−1) in this example. The reservation entries 204(0)-204(M−1) are configured to store received instructions in an instruction pipeline(s) until ready to be executed in the execution circuit 108 (also shown in FIG. 1). The scheduler circuit 200 is configured to issue instructions ready to be executed to one of the issue lanes $L_0$-$L_{K-1}$ that are coupled to respective execution lanes $E_0$-$E_{K-1}$ in the execution circuit 108. The execution circuit 108 is designed to be able to receive and concurrently execute 'K' number of instructions dispatched in K issue lanes $L_0$-$L_{K-1}$, and K execution lanes $E_0$-$E_{K-1}$ are provided for increased performance. Thus, in this example, 'M' is referred to as the instruction window size, and 'K' is referred to as the issue width or the number of issue lanes $L_0$-$L_{K-1}$ in which producer instructions can be issued to the execution circuit 108 to be executed. If the scheduler circuit 200 was included as the scheduler circuit 106 in FIG. 1, the reservation entries 204(0)-204(M−1) would be configured to store decoded instructions 112D from the instruction pipelines $I_0$-$I_N$ before being passed to the execution circuit 108 to be executed. The reservation entries 204(0)-204(M−1) store producer instructions and consumer instructions of the producer instructions. The scheduler circuit 200 ensures that the producer instruction is issued to an issue lane $L_0$-$L_{K-1}$ to be executed by execution circuit 108 before its consumer instruction is issued in an issue lane $L_0$-$L_{K-1}$. The scheduler circuit 200 is a synchronous circuit that is configured to operate and execute functions in cycles of a clock signal of its processor.

With continuing reference to FIG. 2, the scheduler circuit 200 also includes a pick circuit 206 that tracks the instructions in the reservation entries 204(0)-204(M−1) to determine when such instructions are ready to be issued. In this regard, each of the reservation entries 204(0)-204(M−1) are coupled to a wake-up circuit 208 in the pick circuit 206 as indicated by tracking lines 210(0)-210(M−1) that can each communicate tracking information about an instruction stored in a respective reservation entry 204(0)-204(M−1). The wake-up circuit 208 is also coupled to K wake-up signals 212(0)-212(K−1) that are generated by K issue lane circuits 214(0)-214(K−1) in the respective issue lanes $L_0$-$L_{K-1}$. Each issue lane circuit 214(0)-214(K−1) associated with a respective issue lane $L_0$-$L_{K-1}$ is configured to generate a wake-up signal 212(0)-212(K−1) among the K wake-up signals 212(0)-212(K−1) on a wake-up signal port 215 in response to a producer instruction being issued in the respective issue lane $L_0$-$L_{K-1}$. The wake-up signal 212(0)-212(K−1) indicates an issue state as either issue ready or issue not ready. When a producer instruction is issued in an issue lane $L_0$-$L_{K-1}$ by the scheduler circuit 200, this means that it will be executed by the execution circuit 108 and its produced data resulting from execution available to be consumed by any consumer instruction of the producer instruction. The wake-up circuit 208 is configured to compare the wake-up signals 212(0)-212(K−1) having an issue state indicating issue ready for issued producer instructions up to M instructions in the respective reservation entries 204(0)-204(M−1) to determine if any such instructions are ready to be executed. For example, if a reservation entry 204(0)-204(M−1) is a consumer of the issued producer instruction, the issuance of its producer instructions indicated by a wake-up signal 212(0)-212(K−1) indicates that the data from the producer instruction will become available, and thus the consumer instruction can be issued if no other source operands are unavailable. The wake-up circuit 208 is configured to generate M instruction ready signals 216(0)-216(M−1) indicating if an instruction in a respective reservation entry 204(0)-204(M−1) is ready to be issued based on the comparison of the wake-up signals 212(0)-212(K−1) for issued producer instructions to M instructions in the respective reservation entries 204(0)-204(M−1).

With continuing reference to FIG. 2, the pick circuit 206 includes K pick circuits 218(0)-218(K−1) that are configured to receive the M instruction ready signals 216(0)-216(M−1) from the wake-up circuit 208 and generate respective K issue lane pick signals 220(0)-220(K−1) to identify respective instructions in the reservation entries 204(0)-204(M−1) that are ready to be issued, indicated by an issue state being issue ready. Providing the M instruction ready signals 216(0)-216(M−1) to the K pick circuits 218(0)-218(K−1) involves multiplexing of signals if K is not equal to M. Conventionally, K<M, because an execution circuit, such as execution circuit 108, is conventionally not designed to be able to execute M instructions concurrently, nor would such likely be necessary to achieve the desired performance as M instructions may not be ready to issue every clock cycle. The K issue lane pick signals 220(0)-220(K−1) are provided to K issue selection circuits 222(0)-222(K−1) in the reservation circuit 202 and are each coupled to a respective issue lane $L_0$-$L_{K-1}$. The issue selection circuits 222(0)-222(K−1) are each coupled to the reservation entries 204(0)-204(M−1) such that the M reservation entries 204(0)-204(M−1) are multiplexed into K issue selection circuits 222(0)-222(K−1) if K is not equal to M. The issue selection circuits 222(0)-222(K−1) are configured to select an instruction from a reservation entry 204(0)-204(M−1) to be issued in response to the instruction identified in the respective issue lane pick signals 220(0)-220(K−1) having an issue state of issue ready. The issue selection circuits 222(0)-222(K−1) are each configured to provide the identified instruction to be issued from the received respective issue lane pick signals 220(0)-220(K−1) to a respective associated issue lane L-$L_{K-1}$, which is then provided to a respective execution lane $L_0$-$L_{K-1}$ in the execution circuit 108 to be executed.

FIG. 3 is a diagram of an exemplary N×N matrix wake-up circuit 300 that can be included as the wake-up circuit 208 in the scheduler circuit 200 in FIG. 2. The N×N matrix wake-up circuit 300 is configured to compare received wake-up signals issued when producer instructions 112 (FIG. 1) are issued for execution to dispatched consumer instructions 112 that name source operands produced by such producer instructions 112. The N×N matrix wake-up circuit 300 is configured to wake up a consumer instruction 112 to be issued for execution if a producer instruction that generates its source operand(s) is issued as discussed in FIG. 2. The N×N matrix wake-up circuit 300 in FIG. 3 includes N instruction request row circuits 302(0)-302(N-1) that are each associated with a request row 0-N-1, respectively. Each instruction request row circuit 302(0)-302(N-1) in an entry is configured to hold a received dispatch instruction 112 to be scheduled for execution. Instructions 112 dispatched to the scheduler circuit 200 are assigned an available instruction request row circuit 302(0)-302(N-1) in the N×N matrix wake-up circuit 300. There is a separate N×N matrix wake-up circuit 300 provided in the scheduler circuit 200 for each source operand that an instruction can name. For example, if a consumer instruction 112 names a register $R_2$ as a source operand, the consumer instruction 112 is assigned an available instruction request row circuit 302(0)-302(N-1) in an N×N matrix wake-up circuit 300 designated for register $R_2$. An instruction 112 assigned an available instruction request row circuit 302(0)-302(N-1) in the N×N matrix wake-up circuit 300 is held in such instruction request row circuit 302(0)-302(N-1) until its producer instruction is issued by the scheduler circuit 200.

With continuing reference to FIG. 3, the 'N' number of instruction request row circuits 302(0)-302(N-1) is a positive whole number that represents the instruction window size of the processor 102 of FIG. 1. The instruction window size is the number of instructions 112 that can be held in the scheduler circuit 200 for a given source operand at a given time to be issued for execution. When instructions 112 are dispatched to the scheduler circuit 200, an available instruction request row circuit 302(0)-302(N-1) in the N×N matrix wake-up circuit 300 associated with the source operand of the instruction is claimed. The instruction 112 gets assigned a row 0-N-1 and a column 0-N-1 that is the same as the assigned row number in the N×N matrix wake-up circuit 300. The scheduler circuit 200 sets a source operand request circuit R(0,1)-R(N-1,N-2) in the assigned instruction request row circuit 302(0)-302(N-1) for each source operand that the instruction 112 needs to be executed. The source operand request circuit R(0,1)-R(N-1,N-2) may be a bit cell circuit that is configured to store a '0' or '1' logical value. For example, if an instruction 112 is assigned instruction request row circuit 302(0) and needs a source operand from an instruction in instruction request row circuit 302(2), source operand request circuit R(0,2) is stored in a request state (e.g., a '1' logical value) to signify that source operand will generated by the instruction request row circuit 302(2). Thus, this source operand from instruction request row circuit 302(2) is needed by the instruction 112 assigned to instruction request row circuit 302(0) to be executed. The N×N matrix wake-up circuit 300 will indicate if a consumer instruction 112 assigned to instruction request row circuit 302(0) is ready and thus "woken up" when it is known that the producer instruction 112 in instruction request row circuit 302(2) in this example is issued to generate the source operand for the consumer instruction 112. In this manner, the value of the source operand consumed by the consumer instruction 112 assigned to instruction request row circuit 302(0) will be available when such consumer instruction 112 is indicated as ready to be issued for execution from instruction request row circuit 302(0).

With continuing reference to FIG. 3, the N×N matrix wake-up circuit 300 also includes grant circuits 304(0,1)-304(N-1,N-2) that include a respective grant input 306(0,1)-306(N-1,N-2) coupled to each respective source operand request circuit R(0,1)-R(N-1,N-2). The grant circuits 304(0,1)-304(N-1,N-2) may be AND-based logic gates (e.g., an AND gate, NAND gate) as an example. The grant circuits 304(0,1)-304(N-1,N-2) are configured to generate a respective grant output 308(0,1)-308(N-1,N-2) of a granted state based on the request state stored in its coupled source operand request circuit R(0,1)-R(N-1,N-2) to indicate if an instruction 112 assigned to the respective instruction request row circuit 302(0)-302(N-1) is ready to be issued and thus woken up. All the grant outputs 308(0,1)-308(N-1,N-2) in a respective instruction request row circuit 302(0)-302(N-1) are coupled to a respective ready circuit 310(0)-310(N-1). The ready circuits 310(0)-310(N-1) may be OR-based gates (e.g., an OR gate, NOR gate) as an example. The ready circuits 310(0)-310(N-1) are configured to generate a respective ready output $I_0$-$I_{N-1}$ of a ready state to indicate that the instruction 112 assigned to its respective instruction request row circuit 302(0)-302(N-1) is ready to be executed based on its source operands being ready as granted by the respective grant outputs 308(0,1)-308(N-1,N-2) by the respective grant circuits 304(0,1)-304(N-1,N-2) in the given instruction request row circuit 302(0)-302(N-1).

With continuing reference to FIG. 3, it is known that the source operand of a consumer instruction 112 is assigned to one instruction request row circuit 302(0)-302(N-1) and is produced by another producer instruction 112 assigned in another instruction request row circuit 302(0)-302(N-1) with reach R. This is known by the setting of the source operand request circuit(s) R(0,1)-R(N-1,N-2) in the instruction request row circuit 302(0)-302(N-1) assigned to the consumer instruction 112 to the instruction request row circuit 302(0)-302(N-1) assigned to the producer instruction 112. The activation of a grant line $G_0$-$G_{N-1}$ for the instruction request row circuit 302(0)-302(N-1) assigned to the producer instruction 112 causes the ready circuit 310(0)-310(N-1) in the instruction request row circuit 302(0)-302(N-1) assigned to the consumer instruction 112 to generate a ready output $I_0$-$I_{N-1}$ indicating a ready state to wake up the consumer instruction 112. Otherwise, the consumer instruction 112 could be issued before its source operand is ready to be consumed when executed.

In this regard, the N×N matrix wake-up circuit 300 in FIG. 3 also includes the N grant lines $G_0$-$G_{N-1}$ that are associated with request row 0-N-1, respectively. Each grant line $G_0$-$G_{N-1}$ is coupled to every other grant circuit 304(0,1) 304(N-1,N-2) in the same respective grant column 0-N-1 such that each grant line $G_0$-$G_{N-1}$ "reaches" all other request rows 0-N-1. For example, grant line $G_0$ is coupled to grant circuits 304(1,0)-304(N-1,0) in grant column 0. Grant line $G_3$ is coupled to grant circuits 304(0,3)-304(N-1,3) in grant column 3. As instructions 112 are issued by the N×N matrix wake-up circuit 300 from a given instruction request row circuit 302(0)-302(N-1), the grant line $G_0$-$G_{N-1}$ corresponding to the instruction request row circuit 302(0)-302(N-1) is energized as a granted state (e.g., a logical '1' value, voltage Vdd). The setting of grant line $G_0$-$G_{N-1}$ to a granted state allows a dependent consumer instruction 112 to be woken up in the N×N matrix wake-up circuit 300 in the next clock cycle to be issued. For each source operand of a given instruction 112 assigned to instruction request row circuit 302(0)-302(N−1), the source operand request circuit(s) R(0, 1)-R(N−1,N−2) are logically AND'ed with the grant lines $G_0$-$G_{N-1}$ by the grant circuits 304(0,1)-304(N−1,N−2) and then logically OR'ed by the respective ready circuits 310 (0)-310(N−1) to determine whether that source operand of the instruction 112 is ready, indicated by the grant outputs 308(0,1)-308(N−1,N−2). The respective ready outputs $I_0$-$I_{N-1}$ generate the ready outputs $I_0$-$I_{N-1}$ based on the generated grant outputs 308(0,1)-308(N−1,N−2).

Thus, as shown in FIG. 3, the N grant lines $G_0$-$G_{N-1}$ are provided in the same number N as the number of instruction request row circuits 302(0)-302(N−1) so that an instruction 112 woken up in an assigned instruction request row circuit 302(0)-302(N−1) has the ability to wake up an instruction 112 assigned to any other instruction request row circuit 302(0)-302(N−1). Thus, the N×N matrix wake-up circuit 300 has a reach of 'N' in that an instruction 112 woken up in an instruction request row circuit 302(0)-302(N−1) has the ability to wake up another instruction 112 N rows away.

With continuing reference to FIG. 3, each instruction request row circuit 302(0)-302(N−1) also includes a respective ready bypass circuit $RN_0$-$RN_{N-1}$ that is coupled to an input of the respective ready circuits 310(0)-310(N−1). For example, the ready bypass circuits $RN_0$-$RN_{N-1}$ may be bit cells that are each configured to store a bit as a logical '0' or '1' value. The ready bypass circuits $RN_0$-$RN_{N-1}$ are configured to generate ready bypass outputs 314(0)-314(N−1) based on their respective stored values. In the example in FIG. 3, storing a logical '1' value in a ready bypass circuit $RN_0$-$RN_{N-1}$ causes a logical '1' value to be provided as an input to its respective ready circuit 310(0)-310(N−1), which will then automatically cause the ready circuit 310(0)-310 (N−1) to generate a ready output $I_0$-$I_{N-1}$ in a ready state. As will be discussed in more detail below, this functionality may be used to allow the instruction processing circuit 104 to cause an instruction 112 to be woken up if such instruction 112 does not need an operand or if a producer instruction 112 that produces a needed operand has already issued out of the scheduler circuit 200.

A large instruction window is typically desired in a scheduler circuit, such as the scheduler circuit 200 in FIG. 2, to exploit instruction-level parallelism (ILP) and increased performance. However, increasing the instruction window size means that the N×N matrix wake-up circuits 300 provided for each source operand in the scheduler circuit 200 will necessarily be expanded. The increased 'N' grant column depth of the N×N matrix wake-up circuit 300 adds circuit delay in its wake-up paths, because increasing 'N' also adds grant circuit 304(0,1)-304(N−1,N−2) stages in each instruction request row circuit 302(0)-302(N−1). Also, increasing the number of grant circuits 304(0,1)-304(N−1, N−2) in each instruction request row circuit 302(0)-302(N−1) increases the number of grant outputs 308(0,1)-308(N−1,N−2) that increases routing and the logic and/or number of inputs into the respective ready circuits 310(0)-310(N−1). Increased routing can increase circuit resistance (R) and capacitance (C) thereby adding RC delay. This increased delay in the wake-up circuit paths in the N×N matrix wake-up circuit 300 and can risk achieving a single clock cycle timing in the scheduler circuit 200 from instruction grant, to instruction ready, to instruction pick up and back to instruction grant. An important part of a wake-up design in a scheduler circuit 200 may be that a consumer instruction 112 that is dependent on a single-cycle latency producer instruction 112 can be issued by the scheduler circuit 200 in back-to-back clock cycles with the producer instruction 112 to reduce scheduling latency.

In this regard, FIG. 4 is a diagram of an exemplary reach N×R matrix wake-up circuit 400 ("N×R matrix wake-up circuit 400") that has reach R and can be included as the wake-up circuit 208 in the scheduler circuit 200 in FIG. 2. The N×R matrix wake-up circuit 400 in FIG. 4 includes N instruction request row circuits 402(0)-402(N−1) that are each associated with a request row 0-N−1, respectively similar to the N×N matrix wake-up circuit 300 in FIG. 3. The N×R matrix wake-up circuit 400 in FIG. 4 also includes N grant lines $G_0$-$G_{N-1}$ similar to the N×N matrix wake-up circuit 300 in FIG. 3. However, as shown in FIG. 4, the N×R matrix wake-up circuit 400 includes only R grant columns 0-R−1, where 'R' is less than 'N'. Each grant line $G_0$-$G_{N-1}$ is only coupled to source operand request circuit(s) R(0,4)-R(N−1,R−1) in R number of instruction request row circuits 402(0)-402(N−1) as opposed to a source operand request circuit R(0,4)-R(N−1,R−1) in each instruction request row circuits 402(0)-402(N−1). In the example of the N×R matrix wake-up circuit 400 in FIG. 4, each grant line $G_0$-$G_{N-1}$ is coupled to source operand request circuit(s) R(0,4)-R(N−1, R−1) in R number of instruction request row circuits 402 (0)-402(N−1) that are adjacent to each other. Thus, the reach of the N×R matrix wake-up circuit 400 is R, meaning that an instruction 112 woken up in an instruction request row circuit 402(0)-402(N−1) causes its respective grant line $G_0$-$G_{N-1}$ to be activated to a granted state (e.g., a logical '1' value, voltage Vdd). The setting of a grant line $G_0$-$G_{N-1}$ to a granted state allows a dependent consumer instruction 112 to be woken up in N×R matrix wake-up circuit 400 in the next clock cycle to be issued. The N×R matrix wake-up circuit 400 only has the ability to wake up another instruction 112 in only R number of other instruction request row circuits 402(0)-402(N−1) even though there are N instruction request row circuits 402(0)-402(N−1) present. Thus, the reach of one instruction request row circuit 402(0)-402(N−1) to another instruction request row circuit 402(0)-402(N−1) is limited to R and not N, like the N×N matrix wake-up circuit 300 in FIG. 3.

The reduced reach R of the N×R matrix wake-up circuit 400 has a more limited ability than the N×N matrix wake-up circuit 300 in FIG. 3. In the N×N matrix wake-up circuit 300 in FIG. 3, any instruction 112 assigned in any instruction request row circuits 402(0)-402(N−1) as a producer instruction 112 being woken up can cause another instruction 112 as a consumer instruction 112 assigned in any other instruction request row circuits 402(0)-402(N−1) to be woken up. This is because each grant line $G_0$-$G_{N-1}$ is coupled to every other instruction request row circuits 402(0)-402(N−1). However, the reduced reach R of the N×R matrix wake-up circuit 400 in FIG. 4 due to the reduced column depth of the N×R matrix wake-up circuit 400 reduces the number of instruction request row circuits 402(0)-402(N−1) coupled to each grant line $G_0$-$G_{N-1}$ to R. This may reduce or avoid an increase in wake-up path circuit delay in the N×R matrix wake-up circuit 400, since reducing the number of grant lines $G_0$-$G_{N-1}$ to less than 'N' means that there is a reduced number of associated grant circuit 404(0,4)-404(N−1,R−1) stages in each instruction request row circuit 402(0)-402(N−1). Also, reducing or avoiding an increase in the number of grant circuits 404(0,4)-404(N−1,R−1) in each instruction request row circuit 402(0)-402(N−1) reduces or avoids an increase the number of grant outputs 408(0,4)-408(N−1,R−1) that increases routing and the logic and/or number of inputs into the respective ready circuits 410(0)-410(N−1).

In this regard, with continuing reference to FIG. 4, each instruction request row circuit 402(0)-402(N−1) in an entry is configured to hold a received dispatch instruction 112 to be scheduled for execution. Instructions 112 dispatched to the scheduler circuit 200 are assigned an available instruction request row circuit 402(0)-402(N−1) in the N×R matrix wake-up circuit 400. There is a separate N×R matrix wake-up circuit 400 provided in the scheduler circuit 200 for each source operand that an instruction 112 can name. For example, if a consumer instruction 112 names a register R2 as a source operand, the consumer instruction 112 is assigned available instruction request row circuit 402(0)-402(N−1) in a N×R matrix wake-up circuit 400 designated for register R2. An instruction assigned available instruction request row circuit 402(0)-402(N−1) in the N×R matrix wake-up circuit 400 is held in such instruction request row circuit 402(0)-402(N−1) until its producer instruction 112 is issued by the scheduler circuit 200.

With continuing reference to FIG. 4, the 'N' number of instruction request row circuits 402(0)-402(N−1) is a positive whole number that represents the instruction window size of the processor 102. The instruction window size is the number of instructions 112 that can be held in the scheduler circuit 200 for a given source operand at a given time to be issued for execution. When instructions 112 are dispatched to the scheduler circuit 200, an available instruction request row circuit 402(0)-402(N−1) in the N×R matrix wake-up circuit 400 associated with the source operand of the instruction is claimed. The instruction 112 gets assigned a row 0-N−1 and a column 0-R−1 that is the same as the assigned row number in the N×R matrix wake-up circuit 400. The scheduler circuit 200 sets a source operand request circuit R(0,4)-R(N−1, R−1) in the assigned instruction request row circuit 402(0)-402(N−1) for each source operand that the instruction needs to be executed. The source operand request circuit R(0,4)-R(N−1, R−1) may be a bit cell circuit that is configured to store a '0' or '1' logical value. For example, if an instruction 112 is assigned instruction request row circuit 402(4) and needs a source operand from a producer instruction 112 in instruction request row circuit 402(2), source operand request circuit R(4,2) is stored in a request state (e.g., a '1' logical value) to signify that source operand will be generated by the instruction request row circuit 402(2). Thus, this source operand from instruction request row circuit 402(4) is needed by the instruction 112 assigned to instruction request row circuit 402(2) to be executed. The N×R matrix wake-up circuit 400 will indicate if a consumer instruction 112 assigned to instruction request row circuit 402(0) is ready and thus "woken up" when it is known that the producer instruction 112 in instruction request row circuit 402(2) in this example is issued to generate the source operand for the consumer instruction. In this manner, the value of the source operand consumed by the consumer instruction 112 assigned to instruction request row circuit 402(4) will be available when such consumer instruction 112 is indicated as ready to be issued for execution from instruction request row circuit 402(4).

With continuing reference to FIG. 4, the N×R matrix wake-up circuit 400 also includes the grant circuits 404(0,0)-404(N−1,R−1) that include a respective grant input 406(0,4)-406(N−1,R−1) coupled to the N grant lines $G_0$-$G_{N-1}$ corresponding to R respective instruction request row circuits 402(0)-402(N−1). The grant circuits 404(0,4)-404(N−1,R−1) may be AND-based logic gates (e.g., an AND gate, NAND gate) as an example. The grant circuits 404(0,0)-404(N−1,R−1) are configured to generate a respective grant output 408(0,4)-408(N−1,R−1) of a granted state based on the request state stored in its coupled source operand request circuit R(0,4)-R(N−1,R−1) to indicate if an instruction assigned to the respective instruction request row circuit 402(0)-402(N−1) is ready to be issued and thus woken up. For example, grant line $G_2$ is coupled to the grant inputs 406(3,6), 406(4,2), 406(5,2), and 406(6,2) of instruction request row circuits 402(3)-402(6), meaning that an instruction 112 assigned to instruction request row circuit 402(2) can only cause another instruction 112 in instruction request row circuits 402(3)-402(6) to be woken up. An instruction 112 assigned to instruction request row circuit 402(1) for example cannot cause an instruction 112 in instruction request row circuits 402(6) for example given the limited reach of R of the N×R matrix wake-up circuit 400. As another example, grant line $G_6$ is coupled to the grant inputs 406(N−1,0), 406(0,5), 406(1,6), and 406(2,N−1) of instruction request row circuits 402(N−1) and 402(0)-402(2), respectively. This means that an instruction 112 assigned to instruction request row circuit 402(6) can only cause another instruction 112 in instruction request row circuits 402(N−1) and 402(0)-402(2) to be woken up.

With continuing reference to FIG. 4, it is known that the source operand of a consumer instruction 112 is assigned to one instruction request row circuit 402(0)-402(N−1) is produced by another producer instruction 112 assigned in another instruction request row circuit 402(0)-402(N−1) with reach R. This is known by the setting of the source operand request circuit(s) R(0,4)-R(N−1,R−1) in the instruction request row circuit 402(0)-402(N−1) assigned to the consumer instruction 112 to the instruction request row circuit 402(0)-402(N−1) assigned to the producer instruction 112. The activation of the grant line $G_0$-$G_{N-1}$ for the instruction request row circuit 402(0)-402(N−1) assigned to the producer instruction 112 causes a ready circuit 410(0)-410(N−1) in the instruction request row circuit 402(0)-402(N−1) assigned to the consumer instruction 112 to generate a ready output $I_0$-$I_{N-1}$ indicating a ready state to wake up the consumer instruction 112. Otherwise, the consumer instruction 112 could be issued before its source operand is ready to be consumed when executed.

In this regard, with continuing reference to FIG. 4, all the grant outputs 408(0,4)-408(N−1,R−1) in a respective instruction request row circuit 402(0)-402(N−1) are coupled to a respective ready circuit 410(0)-410(N−1). The ready circuits 410(0)-410(N−1) may be OR-based gates (e.g., an OR gate, NOR gate) as an example. The ready circuits 410(0)-410(N−1) are configured to generate a respective ready output $I_0$-$I_{N-1}$ of a ready state to indicate that the instruction 112 assigned to its respective instruction request row circuit 402(0)-402(N−1) is ready to be executed based on its source operands being ready as granted by the respective grant outputs 408(0,4)-408(N−1,R−1) by the respective grant circuits 404(0,0)-404(N−1,R−1) in the given instruction request row circuit 402(0)-402(N−1). For each source operand of a given instruction 112 assigned to instruction request row circuit 402(0)-402(N−1), the source operand request circuit(s) R(0,4)-R(N−1,R−1) are logically AND'ed with its coupled grant lines $G_0$-$G_{N-1}$ by the respective grant circuits 404(0,4)-404(N−1,R−1) and then logically OR'ed by the respective ready circuits 410(0)-410(N−1) to determine whether that source operand of the instruction 112 is ready, indicated by the grant outputs 408(0,4)-408(N−1,R−1). The respective ready outputs $I_0$-$I_{N-1}$ are selected based on the generated grant outputs 408(0,4)-408(N−1,R−1).

With continuing reference to FIG. 4, each instruction request row circuit 402(0)-402(N−1) also includes a respective ready bypass circuit $RN_0$-$RN_{N-1}$ that is coupled to an input of the respective ready circuits 410(0)-410(N−1). For example, the ready bypass circuit $RN_0$-$RN_{N-1}$ may be bit cells that are each configured to store a bit as a logical '0' or '1' value. The ready bypass circuits $RN_0$-$RN_{N-1}$ are configured to generate ready bypass outputs 414(0)-414(N−1) based on its respective stored value. In the example in FIG. 4, storing a logical '1' value in a ready bypass circuit $RN_0$-$RN_{N-1}$ causes a logical '1' value to be provided as an input to its respective ready circuit 410(0)-410(N−1), which will then automatically cause the ready circuit 410(0)-410(N−1) to generate a ready output $I_0$-$I_{N-1}$ in a ready state. As will be discussed in more detail below, this functionality may be used to allow the instruction processing circuit 104 of FIG. 1 to cause an instruction 112 to be woken up if such instruction 112 does not need an operand or if a producer instruction 112 that produces a needed operand has already issued out of the scheduler circuit 200.

FIG. 5 is a flowchart illustrating an exemplary process 500 of a consumer instruction(s) 112 in an instruction request row circuit 402(0)-402(N−1) in the N×R matrix wake-up circuit 400 in FIG. 4 being woken up by issuance of a producer instruction 112 that was assigned another instruction request row circuit 402(0)-402(N−1) with reach 'R' of the consumer instruction 112. The process 500 includes receiving a dispatched instruction 112 comprising a source operand (block 502 in FIG. 5). The process also includes assigning the received dispatched instruction 112 to an instruction request row circuit 402(0)-402(N−1) among the N instruction request row circuits 402(0)-402(N−1) in an N×R matrix wake-up circuit 400 associated with the source operand (block 504 in FIG. 5). The process 500 also includes storing a request state in at least one source operand request circuit R(0,4)-R(N−1, R−1) among the plurality of source operand request circuits R(0,4)-R(N−1,R−1) in the assigned instruction request row circuit 402(0)-402(N−1) for the received dispatched instruction 112 (block 506 in FIG. 5). The at least one source operand request circuit R(0,4)-R(N−1,R−1) in which the request state is stored is associated with at least one grant circuit 404(0,4)-404(N−1,R−1) among the R grant circuits 404(0,4)-404(N−1, R−1) coupled to at least one grant line $G_0$-$G_{N-1}$ associated with an instruction request row circuit 402(0)-402(N−1) that is assigned to a producer instruction 112 naming a target register operand comprising the source operand of the dispatched instruction 112 (block 506 in FIG. 5). The process 500 also includes generating a grant output 408(0,4)-408(N−1, R−1) of a granted state from the at least one grant circuit 404(0,4)-404(N−1, R−1) in the instruction request row circuit 402(0)-402(N−1) assigned to the dispatched instruction 112 (block 508 in FIG. 5). The generating of the grant output 408(0,4)-408(N−1,R−1)) of a granted state is based on a request state stored in at least one source operand request circuit R(0,4)-R(N−1,R−1) coupled to the at least one grant circuit 404(0,4)-404(N−1,R−1) and the at least one grant line $G_0$-$G_{N-1}$ coupled to the at least one grant circuit 404(0,4)-404(N−1,R−1) being in a granted state (block 508 in FIG. 5). The process also includes generating a ready output $I_0$-$I_{N-1}$ of a ready state, based on the at least one grant circuit 404(0,4)-404(N−1,R−1) in the instruction request row circuit 402(0)-402(N−1)) assigned to the dispatched instruction 112 generating the grant output 408(0,4)-408(N−1, R−1) of a granted state (block 510 in FIG. 5).

There may be cases where a consumer instruction 112 is assigned to an instruction request row circuit 402(0)-402(N−1) in the N×R matrix wake-up circuit 400 in FIG. 4 outside the reach of the instruction request row circuit 402(0)-402(N−1) assigned to its producer instruction 112. Thus, it may be desired to provide a secondary, alternative wake-up mechanism to allow such producer instruction 112 to trigger a wake-up of this consumer instruction 112. One example of such a secondary wake-up mechanism can involve recognizing when a consumer instruction 112 would be assigned an instruction request row circuit 402(0)-402(N−1) in the N×R matrix wake-up circuit 400 outside the reach of its producer instruction 112. In this instance, the consumer instruction 112 could be stalled from being dispatched into the scheduler circuit 200 until its producer instruction 112 is issued and is executed to generate a produced value to be consumed by the consumer instruction 112. In response to execution of the producer instruction 112, the consumer instruction 112 can be assigned instruction request row circuit 402(0)-402(N−1) in the N×R matrix wake-up circuit 400 that is immediately ready to be woken without having to wait for the producer instruction 112 to be issued.

In this regard, FIG. 6 is a diagram of an instruction processing circuit 602 that can be provided in a processor and that is configured to stall dispatch of a consumer instruction 112 to a scheduler circuit 604 employing the N×R matrix wake-up circuit 400 in FIG. 4. The processor could be provided as the processor 102 in FIG. 1. The instruction processing circuit 602 can be configured to stall dispatch of the consumer instruction 112 if the consumer instruction 112 would be assigned to an instruction request row circuit 402(0)-402(N−1) in the N×R matrix wake-up circuit 400 outside the reach of the instruction request row circuit 402(0)-402(N−1) assigned to its producer instruction. Common components between the instruction processing circuit 602 in FIG. 6 and the processor 102 in FIG. 1 are shown with common element numbers.

In this regard, with reference to FIG. 6, the fetch circuit 110 of the instruction processing circuit 602 is configured to fetch instruction 112 and decode the fetched instruction 112F in a decode circuit 124 into decoded instructions 112D like previously discussed in FIG. 1. The decoded instructions 112D can include consumer and producer instructions. The instruction processing circuit 602 is configured to assign a mapping entry 129(1)-129(P) in the RAT circuit 128 corresponding to the logical register $R_0$-$R_P$ of the target register operand in a received producer instruction 112D and store an available physical register 130(1)-130(X) in the mapping entry 129(1)-129(P) for the logical register $R_0$-$R_P$. The RAT circuit 128 in FIG. 6 also includes a grant line field 606(1)-606(P) configured to identify a grant line identifier 608(1)-608(P) indicating a grant line in the N×R wake-up matrix circuit 400. In this manner, the RAT circuit 128 can store a grant line identifier 608(1)-608(P) identifying the grant line $G_0$-$G_{N-1}$ associated its target logical register $R_0$-$R_P$ assigned in the RAT circuit 128 to use to track the produced logical register $R_0$-$R_P$ that will be produced by the producer instruction 112. The scheduler circuit 604 is configured to communicate the physical register 130(0)-130(X) of the target register operand of the producer instruction 112 and a grant line identifier 608(1)-608(P) of the grant line $G_0$-$G_{N-1}$ in the assigned instruction request row circuits 402(0)-402(N−1) for the producer instruction 112 as a message 610 to the RAT circuit 128 to update this information in the RAT circuit 128. As discussed below, this will allow the instruction processing circuit 602 to determine if a new incoming consumer instruction 112 is within reach of its producer instruction 112 to determine if the consumer instruction 112 should be stalled.

With continuing reference to FIG. 6, the scheduler circuit 604 is configured to determine an assignment of an instruction request row circuit 402(0)-402(N−1) in a matrix wake-up circuit among a plurality of matrix wake-up circuits for a consumer instruction 112 corresponding to a source operand in the consumer instruction 112. The scheduler circuit 604 is configured to determine if the assigned instruction request row circuit 402(0)-402(N−1) in the N×R matrix wake-up circuit 400 for the received consumer instruction 112 is not within reach (i.e., not coupled) to the grant line $G_0$-$G_{N-1}$ of the instruction request row circuit 402(0)-402(N−1) assigned to its producer instruction 112 by consulting the RAT circuit 128. In response to determining the assigned instruction request row circuit 402(0)-402(N−1) assigned to the received consumer instruction 112 is not within the reach of its producer instruction 112, an instruction queue circuit 612 can stall the received consumer instruction 112 from being dispatched into the N×R matrix wake-up circuit 400. The scheduler circuit 604 can determine if the producer instruction 112 to the consumer instruction 112 has generated a produce value corresponding to the source operand of the consumer instruction 112. Once the producer instruction 112 to the consumer instruction 112 is issued and generates its produce value corresponding to the source operand of the consumer instruction 112, the instruction queue circuit 612 can dispatch the consumer instruction 112 to the N×R matrix wake-up circuit 400. In this manner, the consumer instruction 112 can be woken up and issued. The consumer instruction 112 can be woken up and issued on a next clock cycle without having to wait for a grant line $G_0$-$G_{N-1}$ to energize its assigned instruction request row circuit 402(0)-402(N−1). For example, the scheduler circuit 604 can be configured to generate a ready signal coupled to the ready bypass circuit $RN_0$-$RN_{N-1}$ coupled to the ready circuit 410(0)-410(N−1) of the instruction request row circuit 402(0)-402(N−1) assigned to the consumer instruction 112 to generate the ready bypass output 414(1)-414(N−1) to indicate the consumer instruction 112 as ready as previously discussed in FIG. 4.

With continuing reference to FIG. 6, if however, the scheduler circuit 604 instead determines that the assigned instruction request row circuit 402(0)-402(N−1) assigned to the received consumer instruction 112 is within the reach of its producer instruction 112, the instruction queue circuit 612 can dispatch the received consumer instruction 112 into the N×R matrix wake-up circuit 400 as normal and as previously discussed without stall.

FIG. 7 is a diagram of another instruction processing circuit 702 that can be provided in a processor and that includes another exemplary secondary wake-up mechanism to delay wake-up of a consumer instruction 112 in the N×R matrix wake-up circuit 400 in FIG. 4 in response to determining the consumer instruction 112 is outside the reach of its producer instruction 112. The instruction processing circuit 702 includes some of the same components in the instruction processing circuit 602 in FIG. 6, which are shown with common element numbers. The instruction processing circuit 702 in FIG. 7 includes a content addressable memory (CAM) circuit 704 that includes N-entries. The scheduler circuit 604 is configured to determine an assignment of an instruction request row circuit 402(0)-402(N−1) in a matrix wake-up circuit among the plurality of matrix wake-up circuits for a consumer instruction 112 corresponding to a source operand in the consumer instruction 112. The scheduler circuit 604 is configured to determine if the assigned instruction request row circuit 402(0)-402(N−1) in the N×R matrix wake-up circuit 400 for the received consumer instruction 112 is not within reach (i.e., not coupled) to the grant line $G_0$-$G_{N-1}$ of the instruction request row circuit 402(0)-402(N−1) assigned to its producer instruction 112 by consulting the RAT circuit 128.

In response to determining the assigned instruction request row circuit 402(0)-402(N−1) assigned to the received consumer instruction 112 is not within the reach of its producer instruction, the CAM circuit 704 is configured to compare the physical register 130(1)-130(X) of the source operand of a consumer instruction 112 to the physical register 130(1)-130(X) of the target register operand of the producer instruction 112 that has been issued based on issuance information 708. This allows the instruction processing circuit 702 to determine if the producer instruction 112 of the consumer instruction 112 has been issued by the scheduler circuit 604 using the physical register 130(1)-130(X) of the instructions 112 as tags. In response to a match, the instruction processing circuit 602 knows that the producer instruction 112 of the consumer instruction 112 has been issued. In this regard, a CAM read circuit 706 can be configured to generate a ready signal 710 coupled to the ready bypass circuit $RN_0$-$RN_{N-1}$ coupled to the ready circuit 410(0)-410(N−1) of the instruction request row circuit 402(0)-402(N−1) assigned to the consumer instruction 112 in the N×R matrix wake-up circuit 400 to generate the ready bypass output 414(1)-414(N−1) to indicate the consumer instruction 112 as ready as previously discussed in FIG. 4. This causes the consumer instruction 112 to be woken even though it is assigned to an instruction request row circuit 402(0)-402(N−1) outside the reach of the instruction request row circuit 402(0)-402(N−1) of its producer instruction 112. In this secondary wake-up mechanism, the consumer instruction 112 does not have to be stalled by the instruction queue circuit 612 from being dispatched into the N×R matrix wake-up circuit 400.

A reach scheduler circuit that includes a wake-up circuit that includes one or more N×R matrix wake-up circuits each like the N×R matrix wake-up circuit 400 in FIG. 4 can be advantageous in other exemplary manners. For example, if a processor is configured to use operand buffers to pass operand based data for execution of instructions in its instruction set architecture (ISA), data arcs between producer instructions and consumer instructions can be specified using operand buffers. The life of an operand buffer starts with the producer instruction and ends with the last consumer of the produced value from the producer instruction. Since operand buffers are used for local, short distance data arcs, typically their reach (i.e., distance in terms of number of instructions between producer and consumer) will be limited. This lends itself naturally to employing a reach matrix wakeup circuit, because ISA that enforces local, short distance data arcs between producers and consumers means that there is a requirement or higher probability (if not strictly enforced) that a producer instruction will be within the reach of its consumer instruction when assigned to the N×R matrix wake-up circuit, thus avoiding the need or reducing the use of a secondary wake-up mechanism.

Also, in a processor that supports a non-dataflow ISA that employs general purpose registers to specify data arcs, there is no implicit locality or reach between producers and consumers. However, the processor can still take advantage of producer/consumer pairs that are within reach distance of each other, by using the N×R matrix wake-up circuit for waking up dispatched instructions. Software can optimize for this by keeping producer consumer within reach of each other as much as possible. For example, compilers can be configured to keep producer and consumer instructions within reach of each other and through use of intermediate instructions. Also, if an ISA supports tagging targets, software can communicate that all consumers of a producer are within reach R, and the processor in turn can save power by gating off the logic for the delayed CAM wakeup since all consumers can be woken up through the reach matrix wake-up circuit.

FIG. 8 is a block diagram of an exemplary processor-based system 800 that includes a processor 802 (e.g., a microprocessor) that includes an instruction processing circuit 804 that includes a scheduler circuit 806 that includes a reach scheduler circuit that includes a wake-up circuit that includes one or more N×R matrix wake-up circuits each associated with a source operand(s) where 'N' is the instruction window size of the scheduler circuit 806, and where 'R' is the number of grant lines and thus the "reach" with the instruction window of the matrix wake-up circuit, with 'R' being less than 'N'. For example, the processor 802 in FIG. 8 could be the processor 102 in FIG. 1 that includes the instruction processing circuit 104 including the scheduler circuit 106 that includes the N×R matrix wake-up circuit 400 in FIG. 4 as an example. The processor-based system 800 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer.

In this example, the processor-based system 800 includes the processor 802. The processor 802 represents one or more general-purpose processing circuits, such as a microprocessor, central processing unit, or the like. More particularly, the processor 802 may be an EDGE instruction set microprocessor, or other processor implementing an instruction set that supports explicit consumer naming for communicating produced values resulting from execution of producer instructions. The processor 802 is configured to execute processing logic in instructions for performing the operations and steps discussed herein. In this example, the processor 802 includes an instruction cache 808 for temporary, fast access memory storage of instructions accessible by the instruction processing circuit 804. Fetched or prefetched instructions from a memory, such as from a main memory 810 over a system bus 812, are stored in the instruction cache 808. The instruction processing circuit 804 is configured to process instructions fetched into the instruction cache 1008 and process the instructions for execution. The processor 802 can include a local cache memory 814 to store cached data in the main memory 810. Cache memory 816 outside the processor 802 between the local cache memory 814 and the main memory 810 can also be provided to provide a cache memory system 818.

The processor 802 and the main memory 810 are coupled to the system bus 812 and can intercouple peripheral devices included in the processor-based system 800. As is well known, the processor 802 communicates with these other devices by exchanging address, control, and data information over the system bus 812. For example, the processor 802 can communicate bus transaction requests to a memory controller 819 in the main memory 810 as an example of a slave device. Although not illustrated in FIG. 8, multiple system buses 812 could be provided, wherein each system bus constitutes a different fabric. In this example, the memory controller 819 is configured to provide memory access requests to a memory array 820 in the main memory 810. The memory array 820 is comprised of an array of storage bit cells for storing data. The main memory 810 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 812. As illustrated in FIG. 8, these devices can include the main memory 810, one or more input device(s) 822, one or more output device(s) 824, a modem 826, and one or more display controllers 828, as examples. The input device(s) 822 can include any type of input device, including but not limited to input keys, switches, voice processors, etc. The output device(s) 824 can include any type of output device, including but not limited to audio, video, other visual indicators, etc. The modem 826 can be any device configured to allow exchange of data to and from a network 830. The network 830 can be any type of network, including but not limited to a wired or wireless network, a private or public network, a local area network (LAN), a wireless local area network (WLAN), a wide area network (WAN), a BLUETOOTH™ network, and the Internet. The modem 826 can be configured to support any type of communications protocol desired. The processor 802 may also be configured to access the display controller(s) 828 over the system bus 812 to control information sent to one or more displays 832. The display(s) 832 can include any type of display, including but not limited to a cathode ray tube (CRT), a liquid crystal display (LCD), a plasma display, etc.

The processor-based system 800 in FIG. 8 may include a set of instructions 834A-834F to be executed by the processor 802 for any application desired according to the instructions. The instructions 834A-834F may include obsolescence register-encoded instructions and may be stored in the main memory 810, processor 802, and/or instruction cache 808 as examples of a non-transitory computer-readable medium 836A-836B, 836D-836F. The instructions 834A-834F may also reside, completely or at least partially, within the main memory 810 and/or within the processor 802 during their execution. The instructions 834A-834F may further be transmitted or received over the network 830 via the modem 826, such that the network 830 includes computer-readable medium 836A-836B, 836D-836F.

While the computer-readable medium 836A-836B, 836D-836F is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor, comprising:
an instruction processing circuit comprising one or more instruction pipelines comprising a scheduler circuit, a rename circuit, an execution circuit, and a renaming access table (RAT) circuit comprising a plurality of logical register entries each comprising a mapping entry configured to store a physical register number corresponding to a physical register and a grant line field configured to identify a grant line identifier indicating a grant line;

the instruction processing circuit configured to fetch a plurality of instructions from a memory into an instruction pipeline among the one or more instruction pipelines;

the scheduler circuit configured to receive the plurality of instructions comprising producer instructions and consumer instructions to be scheduled for execution, the scheduler circuit comprising:
- a plurality of N×R matrix wake-up circuits each corresponding to a source operand and each comprising:
  - N instruction request row circuits, where N is a positive whole number equal to or greater than two, wherein each instruction request row circuit among the N instruction request row circuits comprises:
    - a plurality of source operand request circuits each associated with a source operand column among R source operand columns, where R is a positive whole number less than N; and
    - R grant circuits each coupled to a source operand request circuit among the plurality of source operand request circuits; and
  - N grant lines each associated with an instruction request row circuit among the N instruction request row circuits, each grant line among the N grant lines coupled to R grant circuits in the same source operand column in R instruction request row circuits among the N instruction request row circuits; and
- at least one pick circuit corresponding to each matrix wake-up circuit among the plurality of matrix wake-up circuits, the at least one pick circuit configured to issue an instruction among the plurality of instructions to at least one issue lane in the one or more instruction pipelines, in response to receiving a ready signal indicating a ready state for the instruction among the plurality of instructions;

the rename circuit configured to assign a logical register entry in the RAT circuit corresponding to a target register operand of a received producer instruction among the plurality of instructions and store a physical register number of the target register operand in the mapping entry of the assigned logical register entry; and wherein the scheduler circuit is further configured to:
- assign, to the received producer instruction among the plurality of instructions, an instruction request row circuit among the N instruction request row circuits in an N×R matrix wake-up circuit among the plurality of N×R matrix wake-up circuits corresponding to a source operand of the received producer instruction;
- set the grant line associated with the instruction request row circuit assigned to the received producer instruction to a granted state, based on the received producer instruction being granted;
- communicate the physical register number of the target register operand of the received producer instruction and a grant line identifier of the grant line associated with the instruction request row circuit assigned to the received producer instruction;
- store the communicated grant line identifier in the grant line field of the logical register entry in the RAT circuit corresponding to the target register operand of the received producer instruction;
- assign, to a received consumer instruction among the consumer instructions of the plurality of instructions, an instruction request row circuit among the N instruction request row circuits in an N×R matrix wake-up circuit among the plurality of N×R matrix wake-up circuits corresponding to a source operand of the received consumer instruction;
- access a grant line identifier in a logical register entry in the RAT circuit corresponding to the source operand of the received consumer instruction;
- determine if the grant line indicated by the grant line identifier corresponding to the source operand of the received consumer instruction is associated with an instruction request row circuit that is within R instruction request row circuits of the instruction request row circuit assigned to the received consumer instruction; and
- in response to determining the grant line indicated by the grant line identifier corresponding to the source operand of the received consumer instruction is associated with the instruction request row circuit that is within R instruction request row circuits:
  - store a request state in at least one source operand request circuit among the plurality of source operand request circuits in the instruction request row circuit assigned to the received consumer instruction.

2. The processor of claim 1, wherein the instruction processing circuit is further configured to:
- determine an assignment, to the received consumer instruction, of the instruction request row circuit in the N×R matrix wake-up circuit corresponding to the source operand of the received consumer instruction;
- determine if the instruction request row circuit assigned to the received consumer instruction is not coupled to a first grant line among the N grant lines in the N×R matrix wake-up circuit corresponding to the source operand of the received producer instruction, wherein the first grant line is in an instruction row circuit in the N×R matrix wake-up circuit corresponding to the source operand of the received producer instruction; and
- in response to determining the instruction request row circuit assigned to the received consumer instruction is not coupled to the first grant line among the N grant lines in the N×R matrix wake-up circuit corresponding to the source operand of the received producer instruction:
  - stall the received consumer instruction in its instruction pipeline;
  - determine if a producer instruction for the received consumer instruction has generated a produce value corresponding to the source operand of the received consumer instruction; and
  - in response to the producer instruction for the received consumer instruction generating the produce value corresponding to the source operand of the received consumer instruction, issue the received consumer instruction to the execution circuit to be executed.

3. The processor of claim 2, wherein in response to the producer instruction for the received consumer instruction generating the produce value corresponding to the source operand of the received consumer instruction, the instruction processing circuit is further configured to issue a ready signal indicating a ready state for the received consumer instruction.

4. The processor of claim 3, wherein:
   each instruction request row circuit among the N instruction request row circuits in each matrix wake-up circuit among the plurality of N×R matrix wake-up circuits further comprises a ready circuit coupled to each grant circuit among the R grant circuits in that instruction request row circuit;
   each instruction request row circuit among the N instruction request row circuits in each matrix wake-up circuit among the plurality of N×R matrix wake-up circuits further comprises a ready bypass circuit coupled to the ready circuit in that instruction request row circuit; and
   in response to the producer instruction for the received consumer instruction generating the produce value corresponding to the source operand of the received consumer instruction, the instruction processing circuit is configured to issue the ready signal indicating the ready state for the received consumer instruction by being configured to cause the ready bypass circuit coupled to the ready circuit in the instruction request row circuit assigned to the received consumer instruction to generate a ready bypass output of a ready state.

5. The processor of claim 1, wherein:
   each instruction request row circuit among the N instruction request row circuits in each N×R matrix wake-up circuit among the plurality of N×R matrix wake-up circuits further comprises a ready circuit coupled to each grant circuit among the R grant circuits in that instruction request row circuit;
   each instruction request row circuit among the N instruction request row circuits in each N×R matrix wake-up circuit among the plurality of N×R matrix wake-up circuits further comprises a ready bypass circuit coupled to the ready circuit in that instruction request row circuit; and
   the scheduler circuit is further configured to, in response to determining the grant line indicated by the grant line identifier corresponding to the received consumer instruction is associated with an instruction request row circuit that is not within R instruction request row circuits:
      determine if a producer instruction for the received consumer instruction has been issued by the scheduler circuit; and
      in response to determining the producer instruction for the received consumer instruction has been issued by the scheduler circuit:
         stall the received consumer instruction in its instruction pipeline;
         determine if the producer instruction for the received consumer instruction has generated a produce value corresponding to the source operand of the received consumer instruction;
         in response to the producer instruction for the received consumer instruction generating the produce value corresponding to the source operand of the received consumer instruction, issue the received consumer instruction to the execution circuit to be executed.

6. The processor of claim 1, wherein:
   each instruction request row circuit among the N instruction request row circuits in each N×R matrix wake-up circuit among the plurality of N×R matrix wake-up circuits further comprises a ready bypass circuit coupled to a ready circuit in that instruction request row circuit; and
   the scheduler circuit is further configured to, in response to determining the grant line indicated by the grant line identifier corresponding to the received consumer instruction is associated with an instruction request row circuit that is not within R instruction request row circuits:
      determine if a producer instruction for the received consumer instruction has been issued by the scheduler circuit; and
      in response to determining the producer instruction for the received consumer instruction has been issued by the scheduler circuit:
         issue a ready signal to the ready bypass circuit in the instruction request row circuit assigned to the received consumer instruction indicating a ready state for the received consumer instruction, to cause the ready bypass circuit in the assigned instruction request row circuit for the received consumer instruction to generate a ready bypass output of a ready state.

7. The processor of claim 6, wherein the scheduler circuit is configured to determine if the producer instruction for the received consumer instruction has been issued by the scheduler circuit, by being configured to compare the physical register number of the source operand of the received consumer instruction to the physical register number of the target register operand of the producer instruction for the received consumer instruction.

8. The processor of claim 6, further comprising:
   N content addressable memory (CAM) circuits;
   wherein the scheduler circuit is further configured to, in response to determining the grant line indicated by the grant line identifier corresponding to the received consumer instruction is associated with the instruction request row circuit that is not within R instruction request row circuits:
      cause a CAM circuit among the N CAM circuits to compare an issued producer instruction to the received consumer instruction;
      determine if the producer instruction for the received consumer instruction has been issued by the scheduler circuit based on the comparison in the CAM circuit among the N CAM circuits; and
      in response to determining the producer instruction for the received consumer instruction has been issued by the scheduler circuit:
         issue the ready signal to the ready bypass circuit in the instruction request row circuit assigned to the received consumer instruction indicating a ready state for the received consumer instruction, to cause the ready bypass circuit in the instruction request row circuit assigned to the received consumer instruction to generate the ready bypass output of the ready state.

9. The processor of claim 6, wherein the scheduler circuit is further configured to store a request state in at least one source operand request circuit among the plurality of source operand request circuits in the instruction request row circuit assigned to the received consumer instruction, without determining the grant line indicated by the grant line identifier corresponding to the received consumer instruction is associated with the instruction request row circuit that is within R instruction request row circuits.

\* \* \* \* \*